US010509488B2

(12) United States Patent
Nakayama et al.

(10) Patent No.: US 10,509,488 B2
(45) Date of Patent: Dec. 17, 2019

(54) SIMULATION SYSTEM FOR OPERATING POSITION OF A POINTER

(71) Applicant: FUJITSU LIMITED, Kawasaki-shi, Kanagawa (JP)

(72) Inventors: Yu Nakayama, Atsugi (JP); Sachihiro Youoku, Isehara (JP); Tatsuya Suzuki, Setagaya (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 15/804,919

(22) Filed: Nov. 6, 2017

(65) Prior Publication Data
US 2018/0074601 A1 Mar. 15, 2018

Related U.S. Application Data

(63) Continuation of application No. PCT/JP2015/063530, filed on May 11, 2015.

(51) Int. Cl.
G06F 3/033 (2013.01)
G06F 3/0346 (2013.01)
(Continued)

(52) U.S. Cl.
CPC ............ G06F 3/0346 (2013.01); G06F 16/40 (2019.01); G06T 19/003 (2013.01); G06T 19/20 (2013.01)

(58) Field of Classification Search
CPC .... G06F 3/0346; G06F 3/016; G06F 3/03547; G06F 3/0325; G06F 3/038; G06F 2203/0331; G06F 2203/0384
See application file for complete search history.

(56) References Cited

U.S. PATENT DOCUMENTS 6,545,706 B1 * 4/2003 Edwards ................. G06T 7/246
348/169
7,161,579 B2 * 1/2007 Daniel .................... A63F 13/06
345/156
(Continued)

FOREIGN PATENT DOCUMENTS

JP H06-155344 6/1994
JP H11-203040 7/1999
(Continued)

OTHER PUBLICATIONS

International Search Report of Int. Appl. No. PCT/JP2015/063530 dated Jul. 28, 2015.
(Continued)

Primary Examiner — Vijay Shankar
(74) Attorney, Agent, or Firm — Maschoff Brennan

(57) ABSTRACT

A simulation system includes a display section configured to display an image of an article, an operation terminal device which is moved by a user to operate a position of a pointer displayed on the display section, a first detecting section configured to detect a position and an orientation of the operation terminal device, a second detecting section configured to calculate first coordinates of the pointer based on the position and the orientation of the operation terminal device detected by the first detecting section, an offset section configured to obtain second coordinates derived by offsetting the first coordinates, and a first determining section configured to make a determination whether the article displayed on the display section has come in contact with a line connecting the first coordinates and the second coordinates.

12 Claims, 31 Drawing Sheets

(51) Int. Cl.
  *G06F 16/40*  (2019.01)
  *G06T 19/00*  (2011.01)
  *G06T 19/20*  (2011.01)

(56) References Cited

U.S. PATENT DOCUMENTS

| | | | |
|---|---|---|---|
| 7,721,231 B2* | 5/2010 | Wilson | G06F 3/0346 345/156 |
| 8,035,629 B2* | 10/2011 | Daniel | A63F 13/06 345/156 |
| 2002/0015137 A1 | 2/2002 | Hasegawa | |
| 2004/0012557 A1 | 1/2004 | Daniel | |
| 2007/0075966 A1 | 4/2007 | Daniel | |
| 2008/0094351 A1 | 4/2008 | Nogami et al. | |
| 2008/0100588 A1 | 5/2008 | Nogami et al. | |
| 2011/0269544 A1 | 11/2011 | Daniel | |
| 2014/0347329 A1 | 11/2014 | Ware | |

FOREIGN PATENT DOCUMENTS

| | | |
|---|---|---|
| JP | 2000-089895 | 3/2000 |
| JP | 2002-108562 | 4/2002 |
| JP | 2005-050120 | 2/2005 |
| JP | 2005-537596 | 12/2005 |
| JP | 2008-108054 | 5/2008 |
| JP | 2008-134990 | 6/2008 |
| JP | 2009-205461 | 9/2009 |

OTHER PUBLICATIONS

Written Opinion of the International Searching Authority of Int. Appl. No. PCT/JP2015/063530 dated Jul. 28, 2015 translation of the relevant part.
Office Action dated May 2, 2019 issued with respect to the related U.S. Appl. No. 15/801,249.
Office Action dated Jan. 22, 2019 issued with respect to the related Japanese Patent Application No. 2017-517492 with full machine translation.
International Search Report of Int. Appl. No. PCT/JP2015/063524 dated Jul. 14, 2015.
Written Opinion of the International Searching Authority of Int. Appl. No. PCT/JP2015/063524 dated Jul. 14, 2015 with Partial translation.

* cited by examiner

FIG.7

| ARTICLE ID | ARTICLE NAME | VIBRATION INTENSITY [Vpp] | VIBRATING TIME [ms] |
|---|---|---|---|
| 001 | Plate | 10 | 100 |
| | | 10 | 100 |
| | | 10 | 100 |
| 002 | Connector | 10 | 20 |
| | | 10 | 20 |
| | | 10 | 500 |
| 003 | Cable | 10 | 500 |
| | | 10 | 500 |
| ... | ... | ... | ... |

FIG.8

| ARTICLE ID | SHAPE TYPE | REFERENCE COORDINATES [m] (X, Y, Z) | SIZES [m] (X, Y, Z) | ROTATING ANGLES [deg.] ($\theta x, \theta y, \theta z$) |
|---|---|---|---|---|
| 001 | Cube | (0.0, 0.0, 0.0) | (0.8, 0.2, 0.4) | (0.0, 0.0, 0.0) |
| 002 | Cube | (0.6, 0.2, 0.0) | (0.2, 0.2, 0.2) | (0.0, 0.0, 0.0) |
| 003 | Cylinder | (0.8, 0.3, 0.1) | (0.2, 1.0, 0.2) | (0.0, 0.0, 90.0) |
| ... | ... | ... | ... | ... |

FIG.10

| POINTER ID | OFFSET AMOUNT [mm] |
|---|---|
| 001 | (300, 0, 0) |
| ... | ... |

FIG.25

| No. | TIME (hh:mm:ss) | COORDINATES (X, Y, Z) [unit: mm] |
|---|---|---|
| (1) | 13:00:00 | (100, 100, 100) |
| (2) | 13:00:01 | (80, 100, 125) |
| (3) | 13:00:02 | (80, 100, 150) |
| (4) | 13:00:03 | (100, 100, 175) |
| (5) | 13:00:04 | (120, 100, 200) |
| (6) | 13:00:05 | (130, 100, 225) |
| (7) | 13:00:06 | (120, 100, 250) |
| (8) | 13:00:07 | (100, 100, 275) |

FIG.26

| No. | TIME (hh:mm:ss) | COORDINATES (X,Y,Z) [unit: mm] |
|---|---|---|
| (1) | 13:00:00 | (100±10, 100±10, 100) |
| (2) | 13:00:01 | (80±10, 100±10, 125) |
| (3) | 13:00:02 | (80±10, 100±10, 150) |
| (4) | 13:00:03 | (100±10, 100±10, 175) |
| (5) | 13:00:04 | (120±10, 100±10, 200) |
| (6) | 13:00:05 | (130±10, 100±10, 225) |
| (7) | 13:00:06 | (120±10, 100±10, 250) |
| (8) | 13:00:07 | (100±10, 100±10, 275) |

FIG.28

| No. | TIME (hh:mm:ss) | COORDINATES (X, Y, Z) [unit: mm] |
|---|---|---|
| (1) | 13:00:00 | (100, 100, 100) |
| (2) | 13:00:01 | (100, 125, 100) |
| (3) | 13:00:02 | (100, 150, 100) |
| (4) | 13:00:03 | (100, 150, 125) |
| (5) | 13:00:04 | (100, 150, 150) |
| (6) | 13:00:05 | (100, 150, 175) |
| (7) | 13:00:06 | (100, 150, 200) |

SIMULATION SYSTEM FOR OPERATING POSITION OF A POINTER

CROSS-REFERENCE TO RELATED APPLICATION

This application is a continuation application of International Application PCT/JP2015/063530 filed on May 11, 2015 and designated the U.S., the entire contents of which are incorporated herein by reference.

FIELD

The embodiments discussed herein relate to a simulation system.

BACKGROUND

In the related art, an instruction apparatus for directing a position in the virtual space is proposed. The instruction apparatus includes a directing device capable of being directed to a desired direction by a user in a real space toward a three-dimensional image displayed by a virtual space display means, a position and orientation detecting unit for detecting the position and the orientation of the directing device in the real space, an indicator data generating unit for generating indicator data to display, in the three-dimensional image, an indicator having a length in a direction to which the directing device is directed, and a directing device length setting unit for passing the length of the indicator to the indicator data generating unit together with the position and the orientation of the directing device in the real space (see Japanese Laid-Open Patent Publication No. 2005-50120, for example).

However, in the instruction apparatus for directing a position in the virtual space disclosed in the related art, a case may happen where the indicator is hidden by the directing device and cannot be seen from the user. That is, the instruction apparatus in the related art does not provide good operability since visibility of the indicator is not good.

The following is a reference document: [Patent Document 1] Japanese Laid-Open Patent Publication No. 2005-50120.

SUMMARY

According to an aspect of the embodiments, a simulation system includes: a display section configured to display an image of an article based on article data representing a shape and coordinates of the article; an operation terminal device configured to be used by a user holding the operation terminal device with a hand to operate a position of a pointer displayed on the display section by moving the operation terminal device; a data storage section configured to store the article data; a first detecting section configured to detect a position and an orientation of the operation terminal device; a second detecting section configured to calculate first coordinates of the pointer, based on the position and the orientation of the operation terminal device detected by the first detecting section; an offset section configured to obtain second coordinates derived by offsetting the first coordinates; and a first determining section configured to make a determination, based on the coordinates included in the article data and line data representing a first line connecting the first coordinates and the second coordinates, whether the first line has come in contact with the article displayed on the display section.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 7 is a diagram illustrating vibration data;

FIG. 8 is a diagram illustrating article data;

FIG. 10 illustrates data representing an offset amount used in the first embodiment;

FIG. 25 is a table illustrating data representing the line used in the third embodiment;

FIG. 26 is a table illustrating data representing a deformed cylindrical region used in the third embodiment;

FIG. 28 is a table illustrating data representing the line used in the third embodiment;

DESCRIPTION OF EMBODIMENT

Hereinafter, simulation systems according to some embodiments of the present disclosure will be described.

First Embodiment

Figure 1:
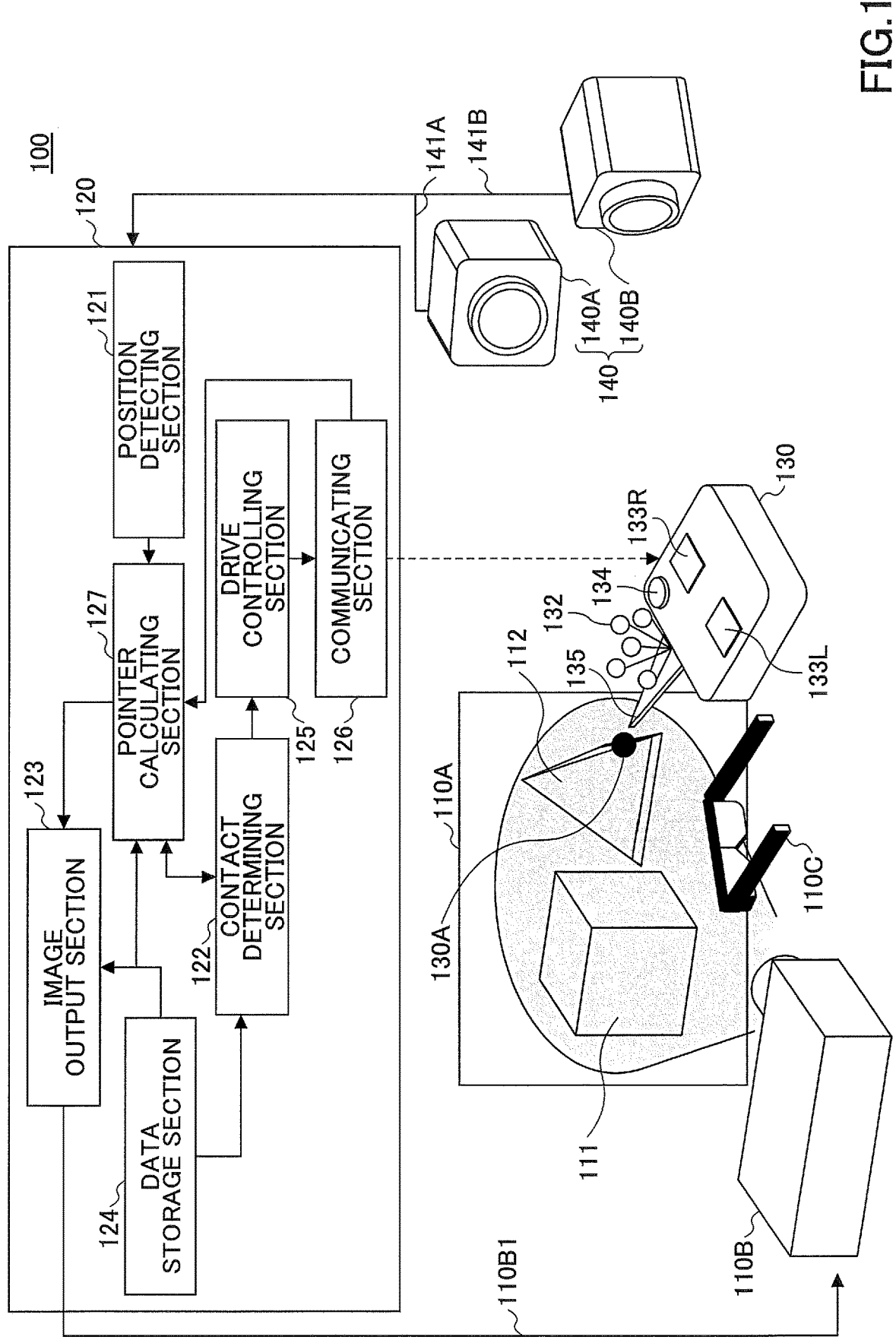
FIG. 1 is a diagram illustrating a simulation system according to a first embodiment.

FIG. 1 is a diagram illustrating a simulation system 100 according to a first embodiment.

The simulation system 100 includes a screen 110A, a projecting apparatus 110B, 3 Dimension (3D) glasses 110C, a processing apparatus 120, an operation terminal device 130, and a position measuring apparatus 140.

The simulation system 100 according to the first embodiment can be applied to an assembly support system which is used for grasping assembly workability in a virtual space. In the assembly support system for example, a work for assembling electronic components, such as a CPU (Central Processing Unit) module, a memory module, a communication module, or connectors, can be simulated in the virtual space.

However, the simulation system 100 according to the first embodiment can be applied not only to the assembly support system but also to various systems for checking workability in a 3-dimensional space.

A screen for a projector can be used as the screen 110A, for example. A size of the screen 110A may be determined as appropriate in accordance with a purpose for using the simulation system 100. On the screen 110A, an image projected by the projecting apparatus 110B is displayed. Here, the case where articles 111 and 112 are displayed on the screen 110A will be described.

The projecting apparatus 110B may be an apparatus that can project images on the screen 110A. For example, a projector can be used as the projecting apparatus 110B. The projecting apparatus 110B is coupled to the processing apparatus 120 through a cable 110B1, to project an image input from the processing apparatus 120 on the screen 110A. The projecting apparatus 110B used in the present embodiment may be a type of apparatus which can project a 3D image (stereoscopic image) on the screen 110A.

Note that the screen 110A and the projecting apparatus 110B are an example of a display section.

A user of the simulation system 100 wears the 3D glasses 110C. The 3D glasses 110C may be a type of glasses which can convert an image projected on the screen 110A by the projecting apparatus 110B into a 3D image. For example, polarized glasses for polarizing incoming light, or LC shutter glasses equipped with liquid crystal shutters can be used.

Note that a liquid crystal display panel may be used instead of the screen 110A and the projecting apparatus 110B, for example. Also, the 3D glasses 110C need not be used when the 3D glasses 110C are not necessary. Further, a head mounted display may be used instead of the screen 110A and the projecting apparatus 110B.

The processing apparatus 120 includes a position detecting section 121, a contact determining section 122, an image output section 123, a data storage section 124, a drive controlling section 125, a communicating section 126, and a pointer calculating section 127. The processing apparatus 120 may be embodied, for example, by a processing unit including a memory, such as a computer.

The position detecting section 121 performs image processing such as pattern matching with respect to image data input from the position measuring apparatus 140 to detect a position and an orientation of the operation terminal device 130. The position of the operation terminal device 130 is expressed as coordinates in a 3-dimensional coordinate space, and the orientation of the operation terminal device 130 is expressed as angles to each axis (three axes) of the 3-dimensional coordinate space.

Note that the position and the orientation of the operation terminal device 130 may be detected by the position measuring apparatus 140.

The pointer calculating section 127 calculates coordinates of a pointer 130A that is located in an image projected on the screen 110A, by using the coordinate value representing the position of the operation terminal device 130, and angle data representing the orientation of the operation terminal device 130.

The pointer calculating section 127 also calculates offset coordinates which are obtained by offsetting the coordinates of the pointer 130A. When the pointer calculating section 127 calculates the offset coordinates, the pointer 130A is displayed at the location corresponding to the offset coordinates. That is, the position of the pointer 130A is offset.

The pointer calculating section 127 outputs, to the contact determining section 122 and the image output section 123, line data representing a line whose endpoints are coordinates before offset and the offset coordinates.

The coordinates before offset are the coordinates of the pointer 130A located in the image projected on the screen 110A, which are derived from the coordinate values representing the position of the operation terminal device 130, and angle data representing the orientation of the operation terminal device 130.

The coordinates before offset are an example of first coordinates. The offset coordinates are an example of second coordinates. Note that the pointer calculating section 127 is an example of a second detecting section.

Further, the line data is data representing a line segment of a straight line whose endpoints are the coordinates before offset and the offset coordinates. In the following description, a "line represented by the line data" represents the line segment of the straight line whose endpoints are the coordinates before offset and the offset coordinates.

The contact determining section 122 determines if the line represented by the line data has touched an image of the article 111 or 112.

The contact determining section 122 uses data (article data) representing a position and a shape of the article 111 or 112 projected on the screen 110A and the line data, to determine whether the image of the article 111 or 112 is in contact with the line represented by the line data or not. The contact determining section 122 is an example of a determining section.

An output terminal of the image output section 123 is coupled to the projecting apparatus 110B through the cable 110B1. The image output section 123 outputs, to the projecting apparatus 110B, an image based on the article data for the articles 111 and 112 stored in the data storage section 124 to display the image on the screen 110A.

Further, the image output section 123 causes the projecting apparatus 110B to display the pointer 130A. The coordinates before offset in the image displayed on the screen 110A are determined based on the position and the orientation of the operation terminal device 130 detected by the position detecting section 121. The pointer 130A is displayed at the location corresponding to the offset coordinates.

The data storage section 124 stores article data representing the coordinates and the shapes of the articles 111 and 112, vibration data representing vibration patterns associated with the articles 111 and 112, an image data of the pointer 130A, data representing an offset amount, and the like. The data storage section 124 is embodied by a memory, and is an example of a data storage section.

When the contact determining section 122 determines that the image of the article 111 or 112 and the line represented by the line data have come in contact, the drive controlling section 125 outputs a driving signal for generating the vibration pattern corresponding to a tactile sensation associated with a part of the article 111 or 112 touched by the line represented by the line data. The driving signal is for driving a vibrating element of the operation terminal device 130.

The communicating section 126 is a communicating section that performs wireless communication with the operation terminal device 130. For example, the communicating section 126 can perform wireless communication in compliance with Bluetooth (registered trademark) or Wi-Fi (Wireless Fidelity) standard. The communicating section 126 transmits the driving signal generated by the drive controlling section 125 to the operation terminal device 130. Note that the communicating section 126 may be a communicating section that performs wired communication with the operation terminal device 130.

The operation terminal device 130 is a terminal device that the user using the simulation system 100 holds with his/her hand(s) to control the position of the pointer 130A displayed on the screen 110A. The operation terminal device 130 includes a marker 132, and vibrating elements 133R and 133L.

The marker 132 includes a plurality of spheres to reflect infrared light radiated from the position measuring apparatus 140 towards various directions. The marker 132 is used by the position measuring apparatus 140 to detect the position of the operation terminal device 130.

The vibrating elements 133R and 133L are respectively provided to generate vibrations at a right side area and a left side area of the operation terminal device 130. Further, the vibrating elements 133R and 133L are driven according to a driving signal generated by the drive controlling section 125. The vibrating elements 133R and 133L are an example of a dynamic element.

Note that details of the operation terminal device 130 will be described later below.

The position measuring apparatus 140 includes infrared cameras 140A and 140B that are respectively coupled to the position detecting section 121 through the cables 141A and 141B. The infrared cameras 140A and 140B emit infrared rays to the operation terminal device 130, to shoot the infrared rays reflected by the marker 132. The position measuring apparatus 140 transfers, to the position detecting section 121, image data output by the infrared cameras 140A and 140B. The position measuring apparatus 140 is an example of a first detecting section.

Figure 2:
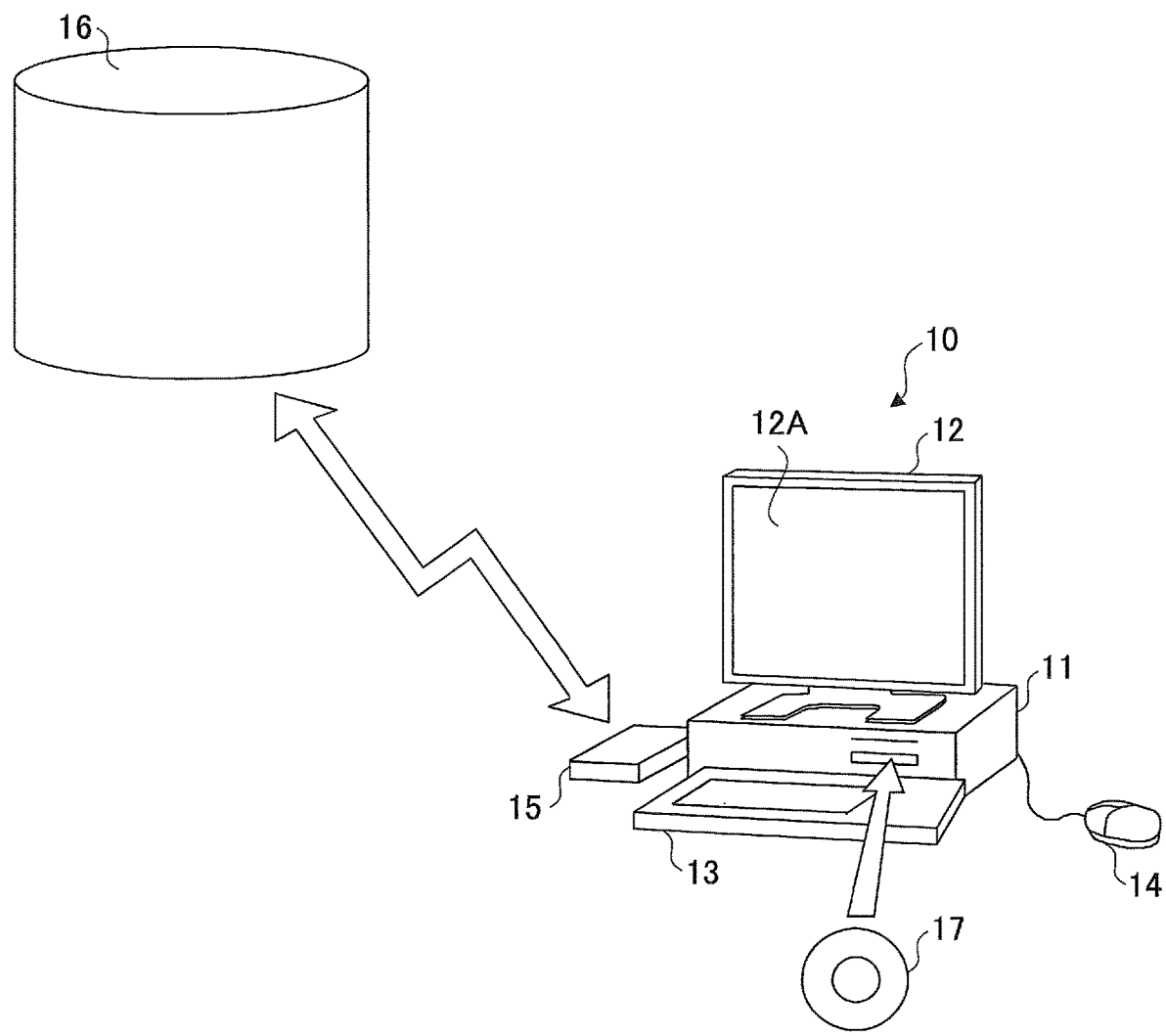
FIG. 2 is a perspective view of a computer system to which a processing apparatus of the first embodiment is applied.

FIG. 2 is a perspective view of a computer system 10 to which the processing apparatus 120 of the first embodiment is applied. The computer system 10 illustrated in FIG. 2 includes a main unit 11, a display 12, a keyboard 13, a mouse 14, and a modem 15.

The main unit 11 includes a Central Processing Unit (CPU), a Hard Disk Drive (HDD), a disk drive, and the like. The display 12 displays an analyzed result or the like on a screen 12A based on an instruction from the main unit 11. The display 12 may be a liquid crystal monitor, for example. The keyboard 13 is an input part for entering various types of information to the computer system 10. The mouse 14 is an input part for designating a suitable position on the screen 12A of the display 12. The modem 15 accesses an external database or the like to download a program or the like stored in other computer system.

A program for causing the computer system to function as the processing apparatus 120 is stored in a removable storage medium such as a disk 17, which is loaded into the computer system 10 and compiled in the computer system 10. Alternatively, the program may be stored in a storage device (or media) 16 in other computer system(s), and is downloaded into the computer system 10 via the modem 15 and the like.

A program for causing the computer system 10 to function as the processing apparatus 120 causes the computer system 10 to operate as the processing apparatus 120. The program may be stored in a computer readable storage medium such as the disk 17. The computer readable storage medium is not limited to a removable storage medium such as the disk 17, an IC card memory, a magnetic disk such as floppy disk (registered trademark), a magneto optical disk, a CD-ROM, a USB (Universal Serial Bus) memory. The computer readable storage medium may include various types of storage media which are accessible in the computer system coupled to the computer system 10 via a communication device such as the modem 15 or LAN.

Figure 3:
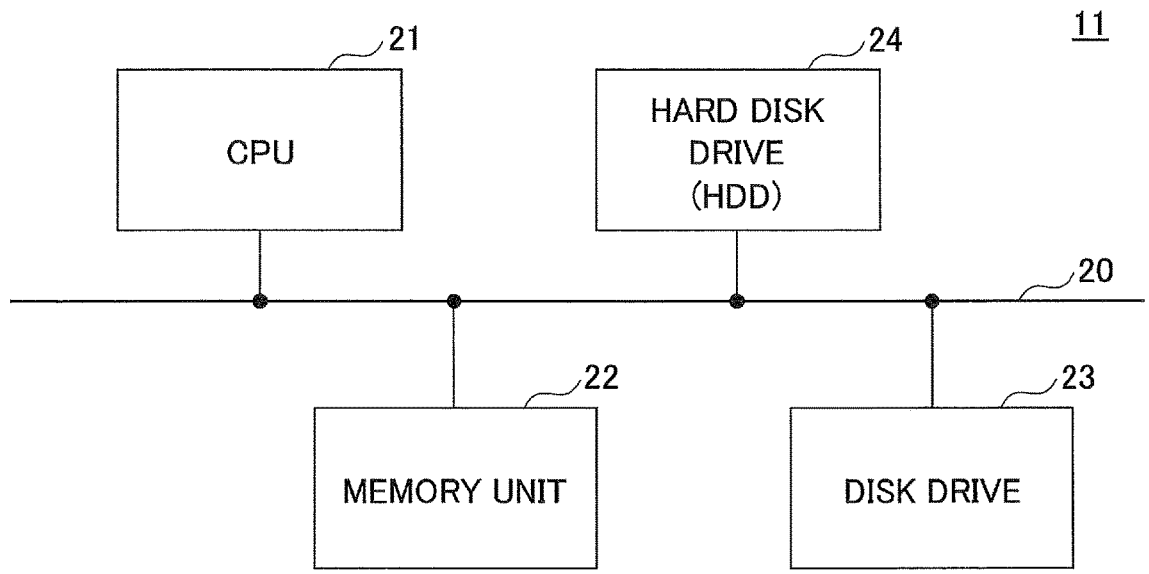
FIG. 3 is a block diagram describing a configuration of major parts in a main unit of the computer system.

FIG. 3 is a block diagram describing a configuration of major parts in the main unit 11 of the computer system 10. The main unit 11 includes a CPU 21, a memory unit 22 including RAM or ROM, a disk drive 23 for accessing the disk 17, and a hard disk drive (HDD) 24, which are connected to each other via a bus 20. In the present embodiment, the display 12, the keyboard 13, and the mouse 14 are connected to the CPU 21 via the bus 20, but may be directly connected to the CPU 21. Also the display 12 may be connected to the CPU 21 via a well-known graphic interface controller (not illustrated in the drawings) for processing input/output image data.

In the computer system 10, the keyboard 13 and the mouse 14 are the input part of the processing apparatus 120. The display 12 is the display section for displaying contents entered in the processing apparatus 120 on the screen 12A.

Note that the configuration of the computer system 10 is not limited to the configuration illustrated in FIG. 2 or FIG. 3, various well-known components may be added to the computer system 10, or various well-known components may be used alternatively.

Figure 4:
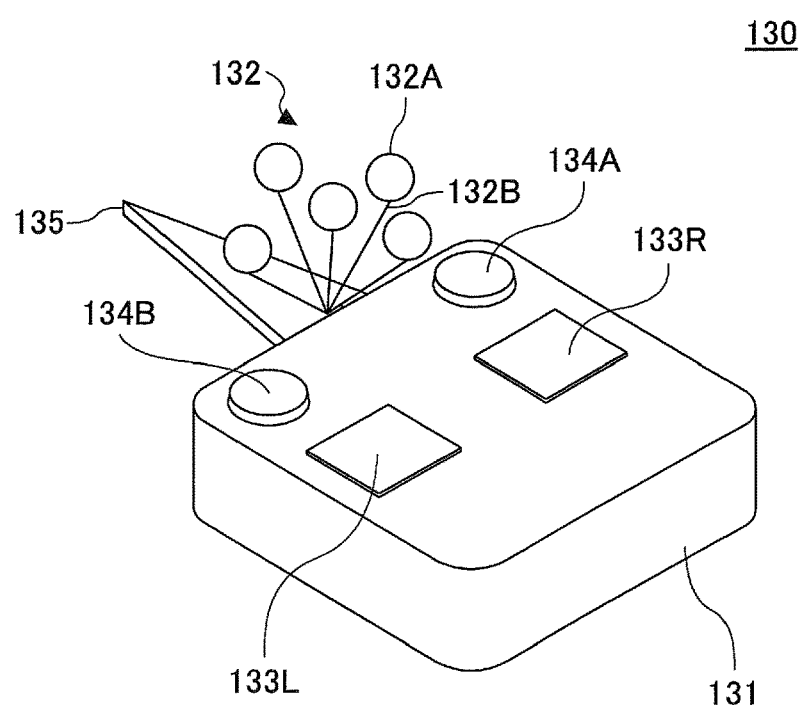
FIG. 4 is a perspective view illustrating an operation terminal device.

FIG. 4 is a perspective view illustrating the operation terminal device 130.

The operation terminal device 130 includes a housing 131, the marker 132, the vibrating elements 133R and 133L, buttons 134A and 134B, and a guide bar 135.

The user holds the operation terminal device 130 in his/her hand such that the guide bar 135, which is an indicator of the position of the pointer 130A (corresponding to the position represented by the coordinates before offset), faces the screen 110A. Hence, with respect to the user facing the screen 110A, the vibrating element 133R is placed on the right side, and the vibrating element 133L is placed on the left side.

In the following description, the right and left direction is expressed based on the viewpoint of the user facing the screen 110A with the operation terminal device 130 held such that the guide bar 135 faces the screen 110A.

Also in the following description, the front and back direction is expressed based on the viewpoint of the user facing the screen 110A with the operation terminal device 130 held such that the guide bar 135 faces the screen 110A.

Further, a surface on which the vibrating elements 133R and 133L are provided is referred to as an upper surface of the housing 131, and a side to which the guide bar 135 is attached is referred to as a front side.

The housing 131 is, for example, made of resin, and is a suitable size for the user to hold in his/her hand. The vibrating elements 133R and 133L are disposed on the upper surface of the housing 131.

The marker 132 includes a plurality of spheres 132A and wires 132B. Each of the spheres 132A is attached to the housing 131 through the wire 132B.

Because the marker 132 is used by the position measuring apparatus 140 to detect the position and the orientation of the operation terminal device 130, the marker 132 reflects, in various directions, infrared rays emitted from the position measuring apparatus 140. The infrared rays reflected by the marker 132 are captured by the infrared cameras 140A and 140B, and the position detecting section 121 performs image processing with respect to the infrared rays captured by the infrared cameras 140A and 140B, to detect a position and an orientation of the marker 132. The position and the orientation of the marker 132 represent the position and the orientation of the operation terminal device 130.

The number of the spheres constituting the marker 132 is not limited to a specific number, if the marker 132 can reflect the infrared rays towards various irregular directions. Also the locations of the spheres are not restricted. Further, objects other than the spheres may be used for the marker 132. The method of detecting position is not limited to the method using the infrared rays. Any object can be used for the marker 132 so far as it can detect the position of the operation terminal device 130.

The vibrating elements 133R and 133L are provided on the upper surface of the housing 131. The vibrating elements 133R and 133L are driven by a driving signal generated by the drive controlling section 125.

The vibrating elements 133R and 133L may be elements for generating vibration such as a piezoelectric element or an LRA (Linear Resonant Actuator). Upon driving the vibrating elements 133R and 133L, vibrations are generated.

Functions of the operation terminal device 130 are assigned to the buttons 134A and 134B, so that the user can control the function using the button 134A or 134B. Multiple buttons may be disposed on the housing 131. Examples of the functions assigned to the button 134A or 134B are, a function to turn on (or turn off) the wireless communication with the processing apparatus 120, a function to control brightness of the pointer 130A, and the like.

The guide bar 135 is attached to the front side of the housing 131. The guide bar 135 is provided so that the user can easily recognize the location at which the pointer 130A is displayed, which acts as an indicator of the position of the pointer 130A. In the present embodiment, the guide bar 135 is a plate member having a long triangular shape, for example.

Any shape of member may be used as the guide bar 135, as far as it acts as an indicator or a reference point when the user holding the operation terminal device 130 in his/her hand moves the position of the pointer 130A displayed on the screen 110A.

If the user can easily recognize the position of the pointer 130A without the guide bar 135, the operation terminal device 130 does not need to include the guide bar 135.

Figure 5:
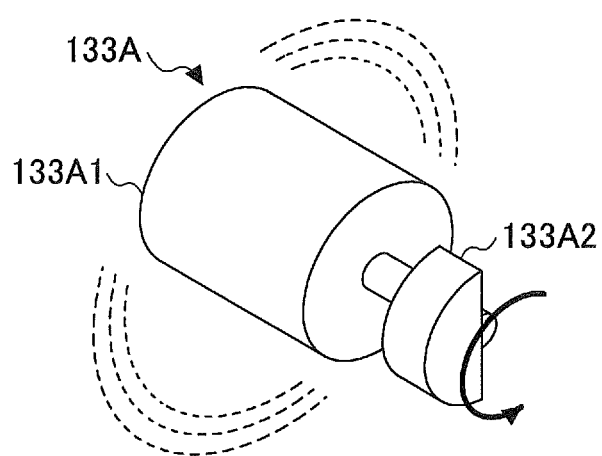
FIG. 5 is a diagram illustrating a vibration motor.

FIG. 5 is a diagram illustrating a vibration motor 133A. The vibration motor 133A includes a base 133A1 and a rotation part 133A2. A winding coil is provided in the base 133A1. The rotation part 133A2 is an eccentric structured member. When the rotation part 133A2 is rotated, it propagates vibration to the base 133A1. Such vibration motor 133A may be used instead of the vibrating elements 133R and 133L illustrated in FIG. 4.

Figure 6:
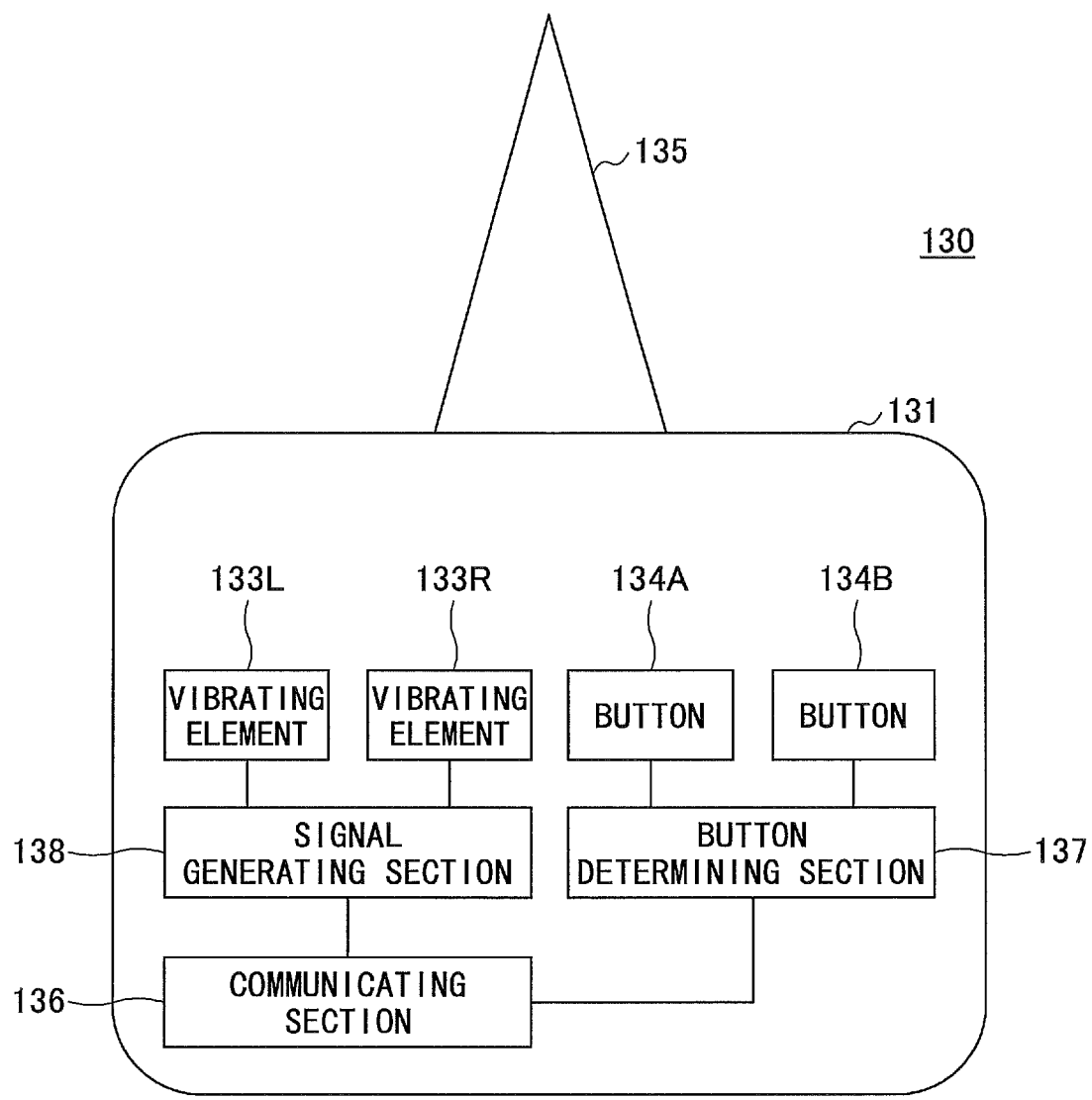
FIG. 6 is a diagram illustrating a configuration of an electrical system in the operation terminal device.

FIG. 6 is a diagram illustrating a configuration of an electrical system in the operation terminal device 130. In FIG. 6, the housing 131 and the guide bar 135 are illustrated in a simplified manner and the marker 132 is omitted.

The operation terminal device 130 includes the vibrating elements 133R and 133L, the buttons 134A and 134B, the communicating section 136, a button determining section 137, and a signal generating section 138. The button determining section 137 and the signal generating section 138 are embodied by a processing device such as a microcomputer.

The button determining section 137 and the signal generating section 138 are coupled to the communicating section 136. The communicating section 136 is a communicating section to perform wireless communication with the communicating section 126 in the processing apparatus 120. The communicating section 136 performs, for example, wireless communication in compliance with Bluetooth, Wi-Fi, Xbee, or ZigBee standard.

The communicating section 136 transmits a signal entered from the button determining section 137 to the processing apparatus 120. Further, the communicating section 136 receives a driving signal generated by the drive controlling section 125 of the processing apparatus 120 to output the driving signal to the signal generating section 138.

The button determining section 137 is a determining section to determine whether the button 134A or 134B is operated or not. For example, the button determining section 137 determines whether the operation to turn on (or off) the wireless communication with the processing apparatus 120 is performed or not, whether the operation to control the brightness of the pointer 130A is performed or not, or whether a selection of an intersection (described later) is performed or not. The button determining section 137 outputs a signal representing content of the operation to the communicating section 136.

The signal generating section 138 amplifies a driving signal received by the communicating section 136 to drive the vibrating element 133R or 133L. Note that the signal generating section 138 may be regarded as a part of the drive controlling section.

FIG. 7 is a diagram illustrating the vibration data.

The vibration data represents a vibration pattern of the vibrating element 133R or 133L. The vibration data includes, for example, an article ID, an article name, vibration intensity, and a vibrating time.

The article ID is an identifier assigned to each article. All articles have article IDs that are different from each other. FIG. 7 illustrates, as examples of the article IDs, 001, 002, and 003.

The article name is a name of an article. FIG. 7 illustrates, as examples of the article names, Plate, Connector, and Cable.

The vibration intensity represents amplitude (Vpp) of a driving signal for driving the vibrating element 133R or 133L. In FIG. 7, the vibration intensity is represented as peak-to-peak voltage.

The vibrating time represents duration of time (ms) for driving the vibrating element 133R or 133L.

Note that the vibration data is stored in the data storage section 124 of the processing apparatus 120.

FIG. 8 is a diagram illustrating article data.

The article data includes data representing the coordinates and the shape of the article which is displayed on the screen 110A. The article data includes an article ID, a shape type, reference coordinates, sizes, and rotating angles.

The shape type represents an exterior shape of the article. FIG. 8, as an example, illustrates a case where information of articles whose shape types are "Cube" (cuboid) and an article whose shape type is "Cylinder" are stored.

The reference coordinates represent the coordinates of a point of reference of an article out of each point of the article. The coordinate values are in units of meters (m). Note that an XYZ coordinate system (three dimensional Cartesian coordinate system) is used as the coordinate system.

The sizes include three values, each of which represents a length in an X-axis direction, a length in a Y-axis direction, and a length in a Z-axis direction of the article. The values are in units of meters (m). For example, the length in an X-axis direction represents a longitudinal length; the length in a Y-axis direction represents a height; and the length in a Z-axis direction represents a depth (lateral length).

The rotating angles include three values, each of which represents X-axis rotation angle θx, Y-axis rotation angle θy, and Z-axis rotation angle θz. The values are in units of degrees (deg.). The rotation angle θx is the value representing by what degree the article is rotated around the X-axis. Also, the rotation angles θy and θz respectively represent by what degree the article is rotated around the Y-axis and the Z-axis. The positive direction of the rotation angles θx, θy and θz may be determined in advance.

By using this article data, an image of each article can be expressed, similar to an image of an article represented by CAD data.

Note that the article data is stored in the data storage section 124 of the processing apparatus 120.

Figure 9:
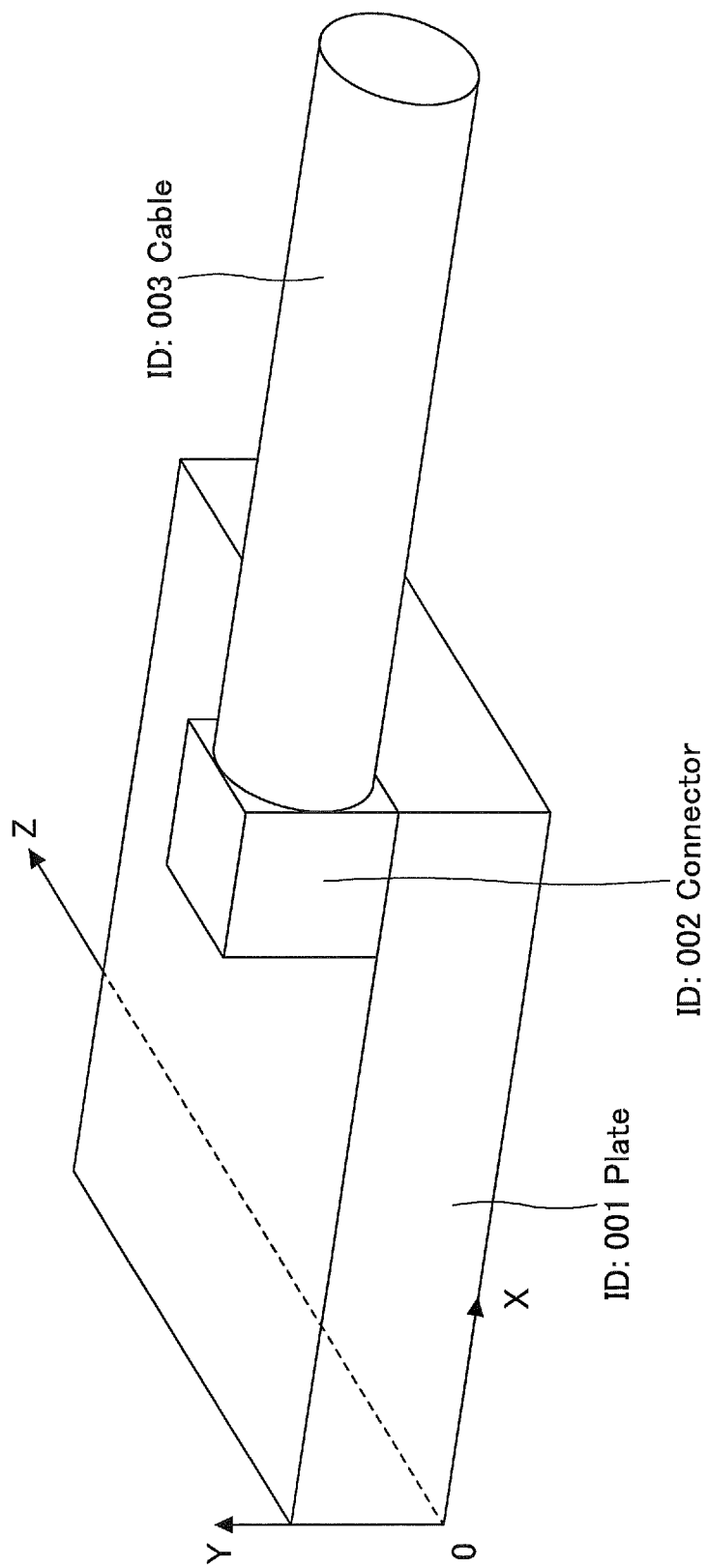
FIG. 9 illustrates an example of images of articles.

FIG. 9 illustrates an example of images of articles.

In FIG. 9, three articles which are expressed based on the article data in FIG. 8 are illustrated.

An article whose article ID is 001 is the article whose shape type is "Cube" (cuboid), whose reference coordinates (X, Y, Z) are (0.0, 0.0, 0.0), whose size is (0.8, 0.2, 0.4), and whose rotating angles θx, θy and θz are (0.0, 0.0, 0.0).

Since the reference coordinates (X, Y, Z) are (0.0, 0.0, 0.0), one of the apexes of the article whose article ID is 001 coincides with the origin (O) of the XYZ coordinates system.

An article whose article ID is 002 is the article whose shape type is "Cube" (cuboid), whose reference coordinates (X, Y, Z) are (0.6, 0.2, 0.0), whose size is (0.2, 0.2, 0.2), and whose rotating angles θx, θy and θz are (0.0, 0.0, 0.0).

Therefore, the article whose article ID is 002 is placed on the article whose article ID is 001.

An article whose article ID is 003 is the article whose shape type is "Cylinder", whose reference coordinates (X, Y, Z) are (0.8, 0.3, 0.1), whose size is (0.2, 1.0, 0.2), and whose rotating angles θx, θy and θz are (0.0, 0.0, 90.0).

Therefore, the article whose article ID is 003 is rotated by 90 degrees around the Z-axis, and is in contact with the article having article ID 002. Among the surfaces of the article having article ID 002, one of the surfaces which is perpendicular to the X-axis and which is the farther from the origin is in contact with the article having article ID 003.

In the present embodiment, as described above, the coordinates and the shape of the article in an image displayed on the screen 110A is determined by using the article data illustrated in FIG. 8 which includes the article ID, the shape type, the reference coordinates, the sizes, and the rotating angles.

For example, in a case where the shape type of an article is "Cube" (cuboid), the coordinates of the eight apexes of the article can be derived by adding or subtracting the length in an X-axis direction, the length in a Y-axis direction, or the length in a Z-axis direction contained in the sizes of the article data, to/from the reference coordinates. The coordinates of the eight apexes represent the coordinates of the corners of the article whose article type is "Cube".

If the coordinates of the eight apexes are obtained, formulas for expressing the twelve edges of the article (cuboid) can be obtained. The formulas for expressing the twelve edges represent the coordinates of the edges of the article whose shape type is "Cube" (cuboid).

Further, by obtaining the coordinates of the eight apexes and/or the formulas for expressing the twelve edges, formulas for expressing the six surfaces of the article whose shape type is "Cube" (cuboid) can be obtained. In other words, the coordinates of the surfaces of the article can be obtained.

In a case where the shape type of an article is "Cylinder", based on the length in an X-axis direction, the length in a Y-axis direction, and the length in a Z-axis direction contained in the sizes of the article data, formulas for expressing circles (or ellipses) at both ends of the cylinder can be obtained. Also, by using the formulas expressing the circles (or ellipses) at both ends of the cylinder and the reference coordinates, formulas expressing the coordinates on the circles (or ellipses) at both ends of the cylinder can be obtained. The coordinates of side surface of the cylinder can be obtained using the formulas expressing the coordinates on the circles (or ellipses) at both ends of the cylinder.

Here, method of obtaining the coordinates and the shape of an image of the article displayed on the screen 110A is described, especially when the shape type of the article is "Cube" or "Cylinder". However, with respect to the articles having various shapes, such as sphere, triangular pyramid, or concave polyhedron, the coordinates and the shape of the article in the image projected on the screen 110A can be obtained.

Figure 10:
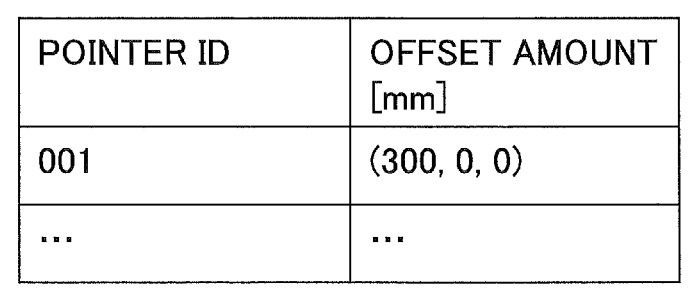

FIG. 10 illustrates data representing an offset amount.

The offset amount is correlated with a pointer ID. The pointer ID is an identifier assigned with each operation terminal device 130. An offset amount in an X-axis direction, an offset amount in a Y-axis direction, and an offset amount in a Z-axis direction, can be correlated with each pointer ID.

In FIG. 10, an example in which 300 mm of an offset amount in the X-axis direction, 0 mm of an offset amount in the Y-axis direction, and 0 mm of an offset amount in the Z-axis direction are correlated with the operation terminal device 130 whose pointer ID is 001.

The data representing the offset amount is stored in the data storage section 124. The data representing the offset amount stored in the data storage section 124 may be a default value in the simulation system 100, or may be a value set by the user as appropriate.

Figure 11:
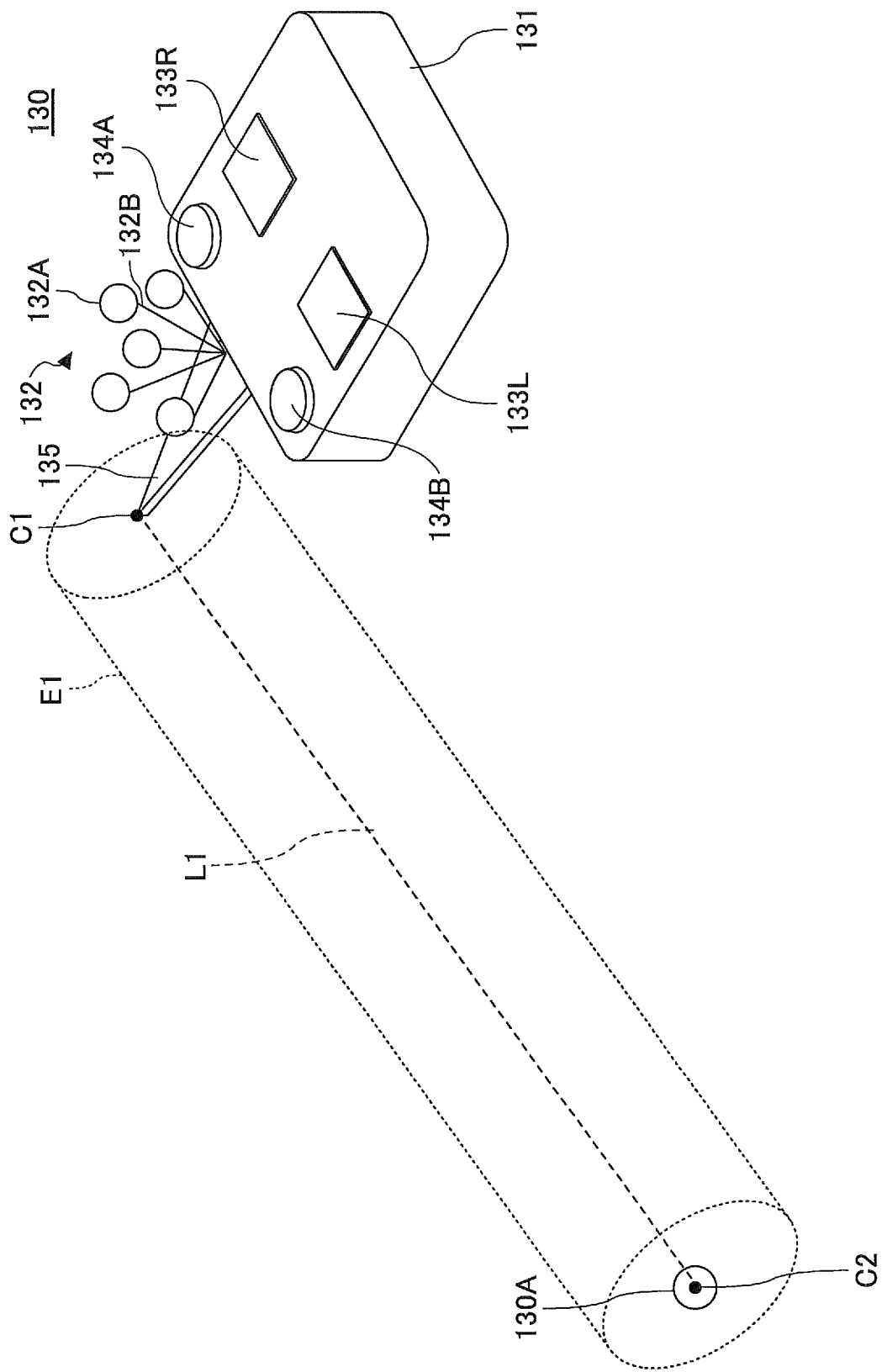
FIG. 11 is a diagram illustrating a line represented by line data used in the first embodiment.

FIG. 11 is a diagram illustrating the line represented by the line data. FIG. 11 illustrates both the line defined in a virtual space which is represented by an image projected on the screen 110A and the operation terminal device 130 existing in a real space.

A line L1 existing in the virtual space is a straight line connecting a point C1 and a point C2. The point C1 corresponds to the position in the virtual space represented by the coordinates before offset, and the point C2 corresponds to the position in the virtual space represented by the offset coordinates. That is, the pointer 130A is offset from the point C1 to the point C2.

Though the line L1 is illustrated by a dotted line in FIG. 11 for convenience of explanation, the line L1 is not actually displayed on the screen 110A. On the screen 110A, the pointer 130A located at the offset coordinates (position at the point C2) is displayed.

The simulation system 100 according to the first embodiment determines whether the line L1 has touched an article or not. If the line L1 has touched an article, the simulation system 100 vibrates the vibrating element 133R or 133L.

The line L1 is expressed by the following formula (1) when the coordinates of the point C1 are (X1, Y1, Z1) and the coordinates of the point C2 are (X2, Y2, Z2).

$$\frac{(X-X1)}{(X2-X1)} = \frac{(Y-Y1)}{(Y2-Y1)} = \frac{(Z-Z1)}{(Z2-Z1)} \quad (1)$$

Note that the line L1 is only defined between the point C1 and the point C2. The line L1 does not exist outside the range between the point C1 and the point C2, since the line data represents the line segment of the straight line whose endpoints are the coordinates before offset (point C1) and the offset coordinates (point C2).

Accordingly, if there is an intersection of the line L1 represented by the formula (1) and the coordinate data of an article, the contact determining section 122 determines that the line L1 has touched an article. If there is no intersection of the line L1 and the coordinate data of an article, the contact determining section 122 determines that the line L1 is not in contact with an article.

As illustrated in FIG. 11, instead of using the line L1, the simulation system 100 may define a cylindrical region E1 whose center axis is the line L1, and determine if the cylindrical region E1 has touched an article. A radius of the cylindrical region E1 may be set as appropriate in accordance with a purpose for a use of the simulation system 100. For example, when the length of the line L1 is 30 cm, the radius of E1 may be set to 1.5 cm. Similar to the line L1, the cylindrical region E1 is not displayed on the screen 110A.

Figure 12:
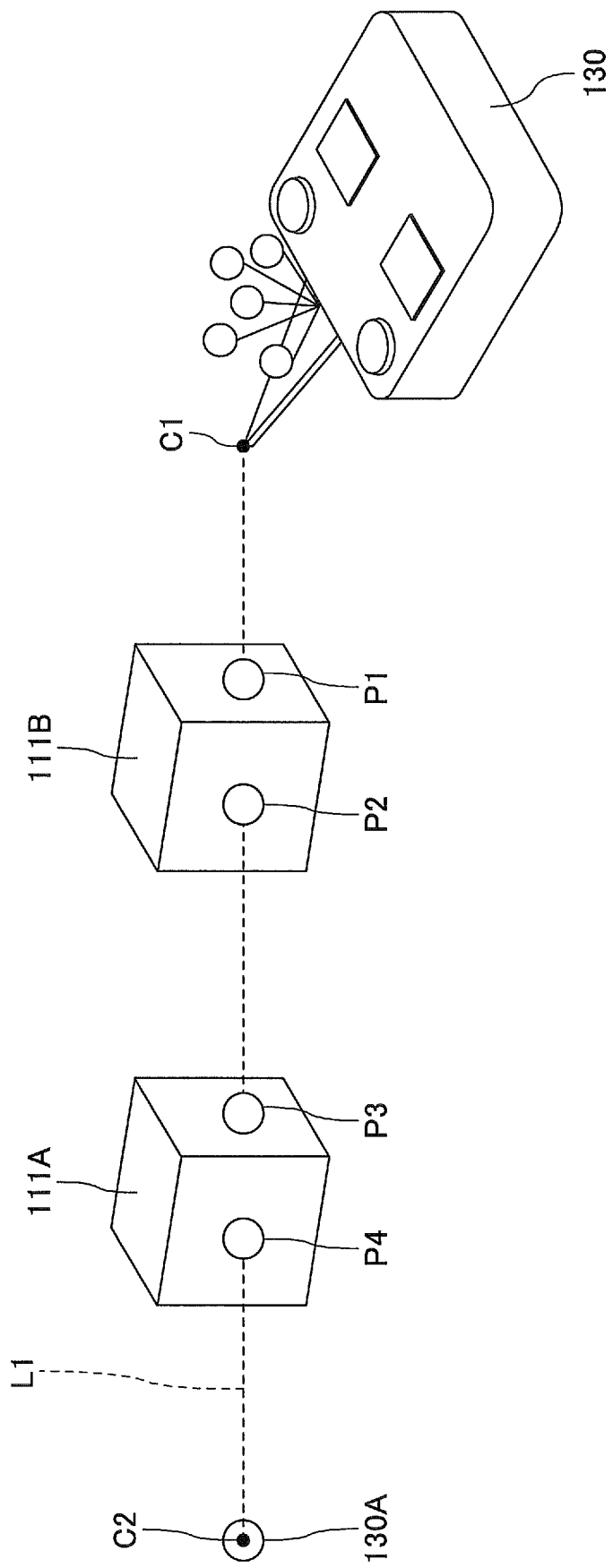
FIG. 12 is a diagram illustrating intersections of articles and the line used in the first embodiment.

FIG. 12 is a diagram illustrating intersections of the line L1 and articles.

Two articles 111A and 111B are illustrated in FIG. 12. Both of the articles 111A and 111B are cubic articles.

FIG. 12 illustrates an example in which four intersections P1, P2, P3, and P4 exist as the intersection of the line L1 and the articles 111A and 111B. On the screen 110A, the pointer 130A, the four intersections P1, P2, P3, and P4, and the two articles 111A and 111B are displayed.

In this case, the contact determining section 122 causes the pointer calculating section 127 to move the pointer 130A to the intersection P1, which is closest to the point C1 corresponding to the coordinates before offset.

In addition, when an instruction to select an intersection is sent from the operation terminal device 130 to the processing apparatus 120 via the wireless communication, the pointer calculating section 127 moves the pointer 130A to the selected intersection. An intersection may be selected using the button 134A or 134B.

Figure 13:
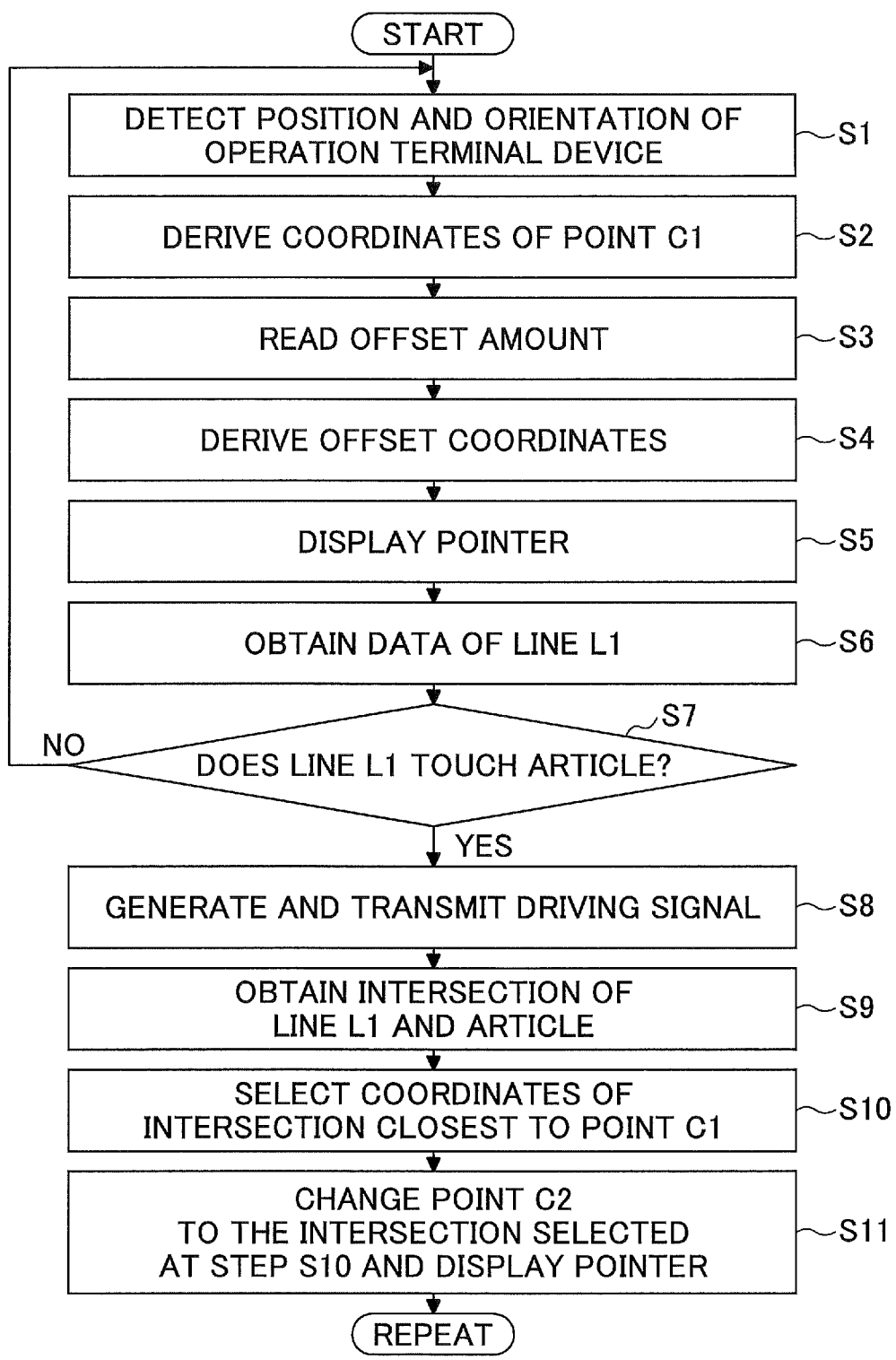
FIG. 13 is a flowchart describing a process performed in a processing apparatus according to the first embodiment.

FIG. 13 is a flowchart describing the process performed in the processing apparatus 120 according to the first embodiment. As an example, the case where articles 111 and 112 are displayed on the screen 110A will be described, as illustrated in FIG. 1.

When power of the processing apparatus 120 is turned on, the processing apparatus 120 acquires the article data and the vibration data from the data storage section 124 before starting the process illustrated in FIG. 13. The processing apparatus 120 generates image signals using the article data, to cause the projecting apparatus 110B to project images. As a result, stereoscopic images of the articles 111 and 112 are displayed on the screen 110A. The images of the articles 111 and 112 displayed on the screen 110A represent virtual objects which exist in the virtual space. The process described here is performed by the image output section 123.

After performing the process described above, the processing apparatus 120 starts processing illustrated in FIG. 13 (start).

The processing apparatus 120 detects a position and an orientation of the operation terminal device 130 in the real space (step S1). The step S1 is performed by the position detecting section 121.

The processing apparatus 120 calculates the coordinates of the point C1 in the virtual space (step S2). The coordinates of the point C1 are the coordinates before offset. The coordinates of the point C1 are calculated by the pointer calculating section 127.

The processing apparatus 120 reads the offset amount from the data storage section 124 (step S3). The data representing the offset amount is stored in the data storage section 124 in advance.

The processing apparatus 120 calculates the coordinates of the point C2 in the virtual space by adding the offset amount to the coordinates of the point C1 (step S4). The coordinates of the point C2 are the offset coordinates. The coordinates of the point C2 are calculated by the pointer calculating section 127.

Data representing the coordinates of the point C2 is entered into the contact determining section 122 and the image output section 123.

The processing apparatus 120 causes the projecting apparatus 110B to display the pointer 130A on the screen 110A, based on the coordinates of the pointer 130A obtained at step S4 (step S5). The pointer 130A is displayed, for example, at the location represented by the coordinates of the point C2.

By performing the step S5, the pointer 130A which is offset is displayed on the screen 110A where the stereoscopic images of the articles 111 and 112 are displayed.

Also at step S5, the processing apparatus 120 may display the pointer 130A using an image data representing the pointer 130A. With respect to the data representing the pointer 130A, data similar to the article data of the article 111 or 112 may be prepared in advance. When the data is prepared in advance, the processing apparatus 120 may display the stereoscopic images of the pointer 130A using the data. However, if the processing apparatus 120 can display the pointer 130A without using the image data of the pointer, it is not required that the image data of the pointer 130A be stored in the data storage section 124.

The step S5 is performed by the image output section 123.

The processing apparatus 120 obtains the formula (line data) expressing the line L1 (step S6). The line data of the line L1 (hereinafter referred to as the "line L1 data") is calculated by the contact determining section 122 using the coordinate data of the points C1 and C2. Alternatively, the pointer calculating section 127 may calculate the line L1 data and output the line L1 data to the contact determining section 122.

The processing apparatus 120 determines whether the line L1 has touched the article 111 or 112 (step S7). The step S7 is performed by the contact determining section 122. Based on the article data of the articles 111 and 112, and the line L1 data obtained at step S6, the contact determining section 122 determines whether the line L1 has touched the article 111 or 112.

Whether the article 111 or 112 is touched by the line L1 or not may be determined by checking if there is an intersection of the line L1 and the article 111 or 112.

Alternatively, whether the article 111 or 112 is touched by the line L1 or not may be determined by checking if distance between the coordinates represented by the line L1 data and the coordinates included in the article that is closest to the line L1 is not more than a given value. If the method of checking the distance between the coordinates represented by the line L1 data and the coordinates included in the article that is closest to the line L1 not being more than a given value is preferred from the perspective of the operability of the operation terminal device 130 in the simulation system 100, the method of checking the distance between the coordinates represented by the line L1 data and the coordinates included in the article that is closest to the line L1 may be adopted.

Next, the process performed at step S8 will be described. In describing the process at step S8, it is assumed that the line L1 has touched the article 111. Note that, when the line L1 has touched the article 112, a similar process is performed.

When the processing apparatus 120 determines that the line L1 has touched the article 111 (S7: YES), the processing apparatus 120 reads the vibration intensity and the vibrating time from the vibration data, generates a driving signal for driving the vibrating elements 133R and 133L of the operation terminal device 130, and transmits the driving signal to the operation terminal device 130 via the communicating section 126 (step S8). As a result, the vibrating elements 133R and 133L of the operation terminal device 130 are driven. The step S8 is performed by the drive controlling section 125.

When the processing apparatus 120 determines that the line L1 has touched the article 111, the processing apparatus 120 may calculate the direction of contact of the line L1 with the article 111 (from which direction the line L1 has come in contact with the article 111), based on the data representing the time variation of the coordinates of the line L1. The direction of contact may be calculated based on the position of the line L1 with respect to the article 111 at the time just before the line L1 has touched the article 111.

When expressing that the line L1 approaches the article 111 from the right and the left side of the line L1 touches the article 111, the vibrating element 133L disposed on the left side of the operation terminal device 130 may be driven.

When expressing that the line L1 approaches the article 111 from the left and the right side of the line L1 touches the article 111, the vibrating element 133R disposed on the right side of the operation terminal device 130 may be driven.

The processing apparatus 120 obtains the coordinates of the intersections of the line L1 and the article 111, to display the intersections on the screen (step S9). Since the line L1 penetrates the article except the case where the line L1 is in contact with the corner or the edge of the article, at least two intersections are obtained.

In displaying the intersection, the processing apparatus 120 may display an image expressing a stereoscopic model of a point. Such an image may be stored in the data storage section 124.

The processing apparatus 120 extracts the coordinates of the intersection which is closest to the point C1, among the intersections obtained at step S9 (step S10).

The processing apparatus 120 changes the coordinates of the point C2 to the coordinates of the intersection extracted at step S10, to display the pointer 130A at the changed position of the point C2 (step S11). Specifically, the pointer 130A is displayed at the position of the intersection P1, and the intersections P2, P3, and P4 will not be displayed.

After finishing step S11, the process is repeated from the start (repeat).

If it is determined at step S7 that the line L1 has not touched the article 111 or 112 (S7: NO), the process reverts to step S1.

As described above, in the simulation system 100 according to the first embodiment, the user can operate the pointer 130A, the display location of which is offset, using the operation terminal device 130. Hence, a case where the pointer 130A is hidden behind the operation terminal device 130 is less likely to occur, and the visibility of the pointer 130A will improve.

Accordingly, the simulation system 100 with a good operability can be provided.

Also in the simulation system 100 according to the first embodiment, when the line L1 extending from the pointer 130A operated with the operation terminal device 130 has touched an article such as the article 111 or 112 in the image projected on the screen 110A, the vibrating element 133R or 133L is vibrated.

Therefore, the user can recognize that contact has occurred simply by the tactile sensation.

Also in the simulation system 100 according to the first embodiment, one of the vibrating element 133R and the vibrating element 133L is vibrated, in accordance with the direction from which the line L1, extending from the pointer 130A operated with the operation terminal device 130, touches an article.

Therefore, the user can recognize the direction from which the line L1 extending from the pointer 130A touches an article.

In the above description, the example is explained such that the position and the orientation of the operation terminal device 130 are detected using the position measuring apparatus 140 (the infrared cameras 140A and 140B) and the marker 132. However, the position and the orientation of the operation terminal device 130 may be detected using at least one of an infrared depth sensor, a magnetometer, a stereo camera, an acceleration sensor, and an angular velocity sensor, which do not require the marker 132.

Second Embodiment

Figure 14:
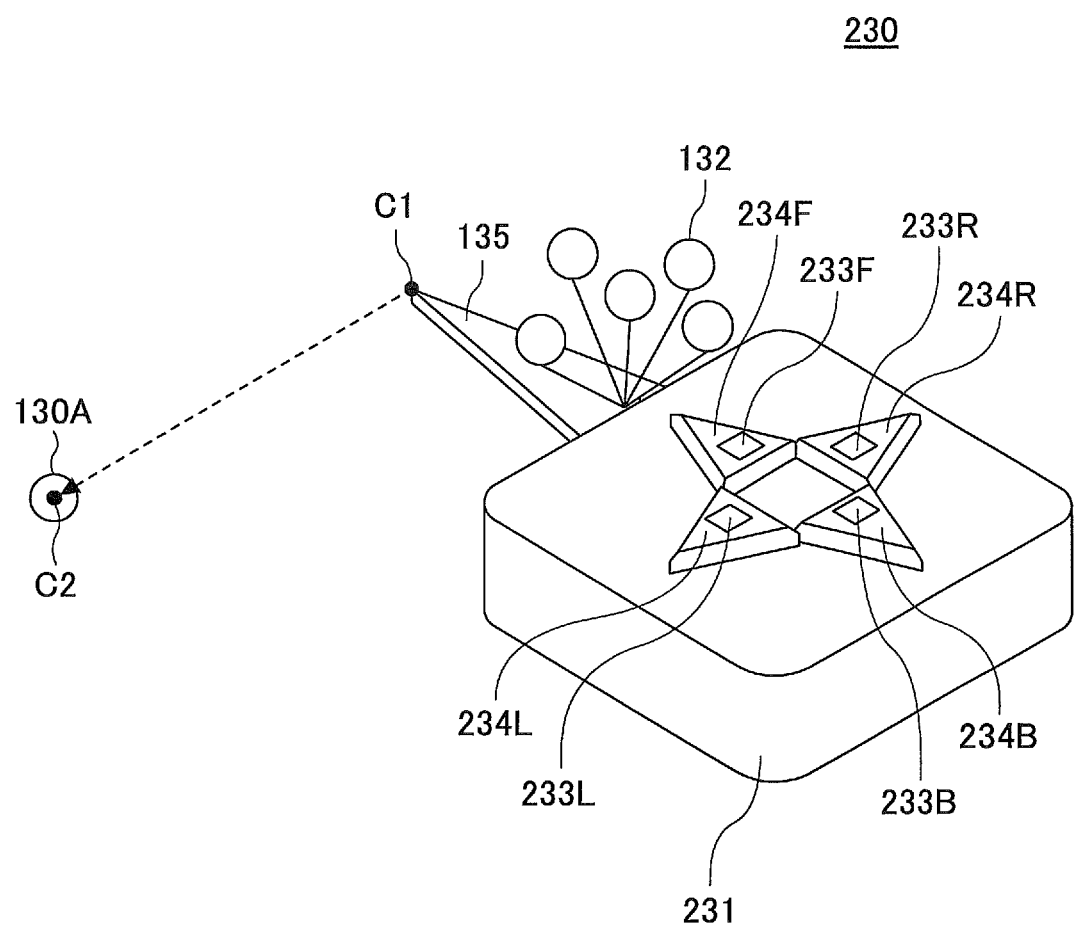
FIG. 14 is a diagram illustrating an operation terminal device according to a second embodiment.

FIG. 14 is a diagram illustrating an operation terminal device 230 according to a second embodiment. The simulation system according to the second embodiment is configured by replacing the operation terminal device 130 included in the simulation system 100 according to the first embodiment with the operation terminal device 230.

In the following description, with respect to the components same as the components in the operation terminal device 130 according to the first embodiment, the same symbols are attached and the explanation about the components is omitted.

For convenience of explanation, the operation terminal device 230 existing in a real space, and the pointer 130A existing in a virtual space which is displayed on the screen 110A, are illustrated in FIG. 14. Note that points C1 and C2 are not actually displayed on the screen 110A.

The operation terminal device 230 includes a housing 231, a marker 132, vibrating elements 233R, 233L, 233F, and 233B, buttons 234R, 234L, 234F, and 234B, and a guide bar 135.

Also, the operation terminal device 230 includes an electrical system similar to the electrical system (FIG. 6) in the operation terminal device 130 according to the first embodiment. When the button 234R, 234L, 234F, or 234B is operated, an instruction signal representing contents of an operation is sent to the processing apparatus 120 via wireless communication.

The buttons 234R, 234L, 234F, and 234B are disposed on the housing 231.

The buttons 234R, 234L, 234F, and 234B are used when a user offsets a position of the pointer 130A from the point C1 to the point C2. All the buttons 234R, 234L, 234F, and 234B are designed to be used by pushing the buttons 234R, 234L, 234F, and 234B.

When the pointer 130A is to be moved rightward in the image projected on the screen 110A, the button 234R is used. When the pointer 130A is to be moved leftward in the image projected on the screen 110A, the button 234L is used.

When the pointer 130A is to be moved forward in the image projected on the screen 110A, the button 234F is used. When the pointer 130A is to be moved backward in the image projected on the screen 110A, the button 234B is used.

Right or left direction may be determined, for example, whether the direction (position) to which the pointer 130A to be moved is located at the right side or at the left side in the image projected on the screen 110A seen from the user, on the basis of a line between the marker 132 in the real space and the pointer 130A in the virtual space. Similarly, front or back direction may be, for example, determined as in the following. The inner side (farther from the user) in the image projected on the screen 110A may be determined as the front side, and the near side (closer to the user) in the image projected on the screen 110A may be determined as the back side.

The line between the marker 132 in the real space and the pointer 130A in the virtual space may be obtained by converting the position of the marker 132 in the real space into a position in the virtual space, and by calculating the line connecting the converted position of the marker 132 (position in the virtual space) and the position of the pointer 130A in the virtual space.

By operating the buttons 234R, 234L, 234F, and 234B described above, the user can offset the position of the pointer 130A from the point C1 toward the point C2.

The vibrating elements 233R, 233L, 233F, and 233B are respectively disposed on the center of the buttons 234R, 234L, 234F, and 234B. The vibrating elements 233R, 233L, 233F, and 233B are driven in accordance with a driving signal generated in the drive controlling section 125.

The vibrating elements 233R, 233L, 233F, and 233B may be, for example, an element containing a piezoelectric element or an LRA (Linear Resonant Actuator), similar to the vibrating element 133R or 133L illustrated in FIG. 4. Upon driving the vibrating elements 233R, 233L, 233F, and 233B respectively, vibrations are generated on the surfaces of the buttons 234R, 234L, 234F, and 234B.

For example, when the pointer 130A approaches the article 111 from the back side and the front side of the line L1 touches the article 111, the vibrating element 233F disposed on the front side of the operation terminal device 230 may be driven.

When the pointer 130A approaches the article 111 from the front side and the back side of the line L1 touches the article 111, the vibrating element 233B disposed on the back side of the operation terminal device 230 may be driven.

When the pointer 130A approaches the article 111 from the left side and the right side of the line L1 touches the article 111, the vibrating element 233R disposed on the right side of the operation terminal device 230 may be driven.

When the pointer 130A approaches the article 111 from the right side and the left side of the line L1 touches the article 111, the vibrating element 233L disposed on the left side of the operation terminal device 230 may be driven.

When the processing apparatus 120 determines that the line L1 has touched the article 111, the processing apparatus 120 may calculate the direction of contact of the line L1 with the article 111 (from which direction the line L1 has come in contact with the article 111), based on the data representing the time variation of the coordinates of the line L1. After the calculation, the processing apparatus 120 may drive one of the vibrating elements 233R, 233L, 233F, and 233B based on the contact direction as described above.

Figure 15:
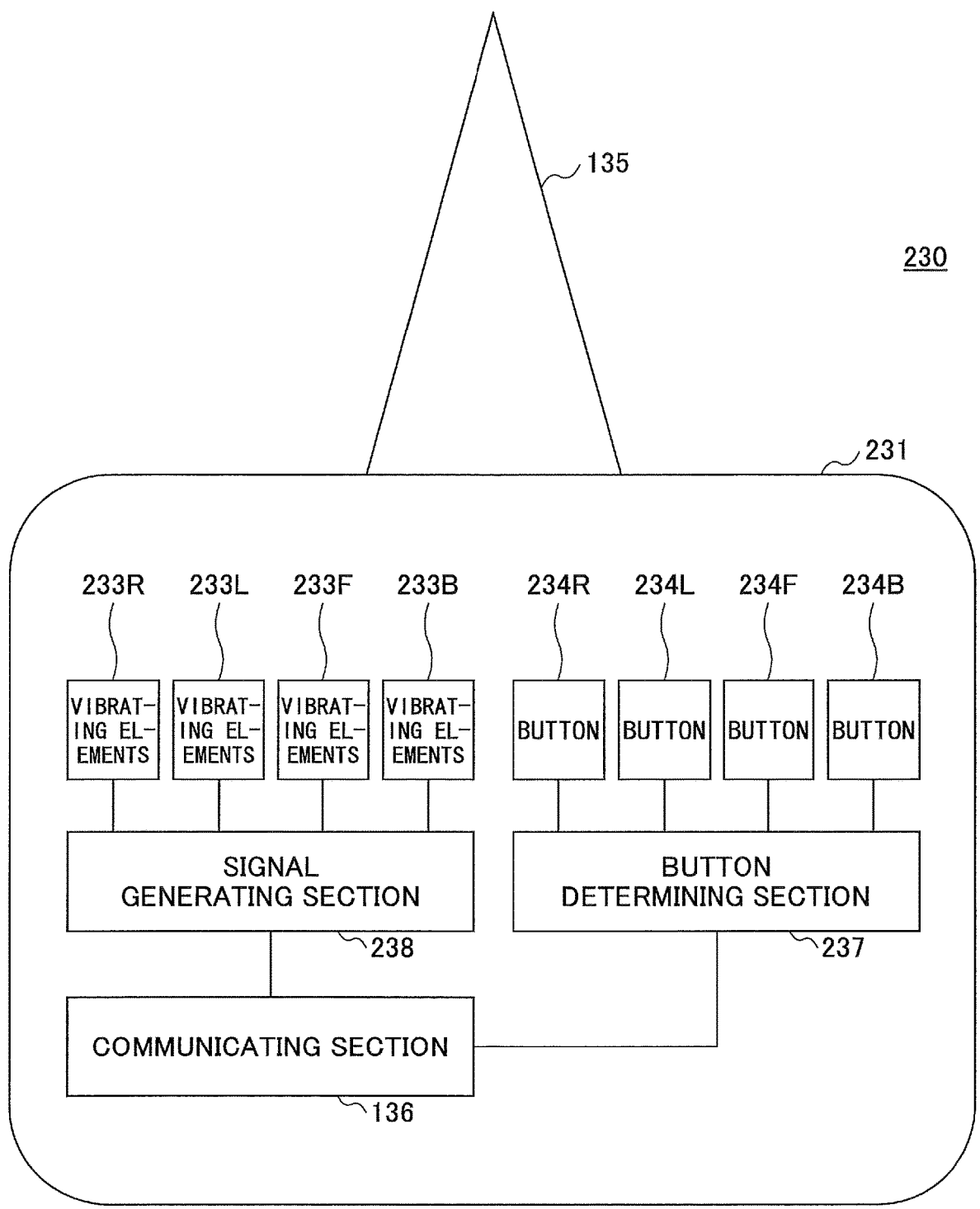
FIG. 15 is a diagram illustrating a configuration of an electrical system in the operation terminal device according to the second embodiment.

FIG. 15 is a diagram illustrating a configuration of an electrical system in the operation terminal device 230. In FIG. 15, the housing 231 and the guide bar 135 are illustrated in a simplified manner and the marker 132 is omitted.

The operation terminal device 230 includes the vibrating elements 233R, 233L, 233F, and 233B, the buttons 234R, 234L, 234F, and 234B, a communicating section 136, a button determining section 237, and a signal generating section 238. The button determining section 237 and the signal generating section 238 are embodied by a processing device such as a microcomputer.

The button determining section 237 and the signal generating section 238 are coupled to the communicating section 136. The communicating section 136 is a communicating section to perform wireless communication with the communicating section 126 in the processing apparatus 120. The communicating section 136 performs, for example, wireless communication in compliance with Bluetooth, Wi-Fi, Xbee, or ZigBee standard.

The communicating section 136 transmits a signal entered from the button determining section 237 to the processing apparatus 120. Further, the communicating section 136 receives a driving signal generated by the drive controlling section 125 of the processing apparatus 120, then outputs the driving signal to the signal generating section 238.

The button determining section 237 is a determining section to determine whether the button 234R, 234L, 234F, or 234B is operated or not. The button determining section 237 performs the determination for each button (234R, 234L, 234F, and 234B). The button determining section 237 outputs a signal representing contents of the operation to the communicating section 136.

The signal generating section 238 amplifies a driving signal received by the communicating section 136 to drive the vibrating elements 233R, 233L, 233F, and 233B. Note that the signal generating section 238 may be regarded as a part of the drive controlling section.

Figure 16:
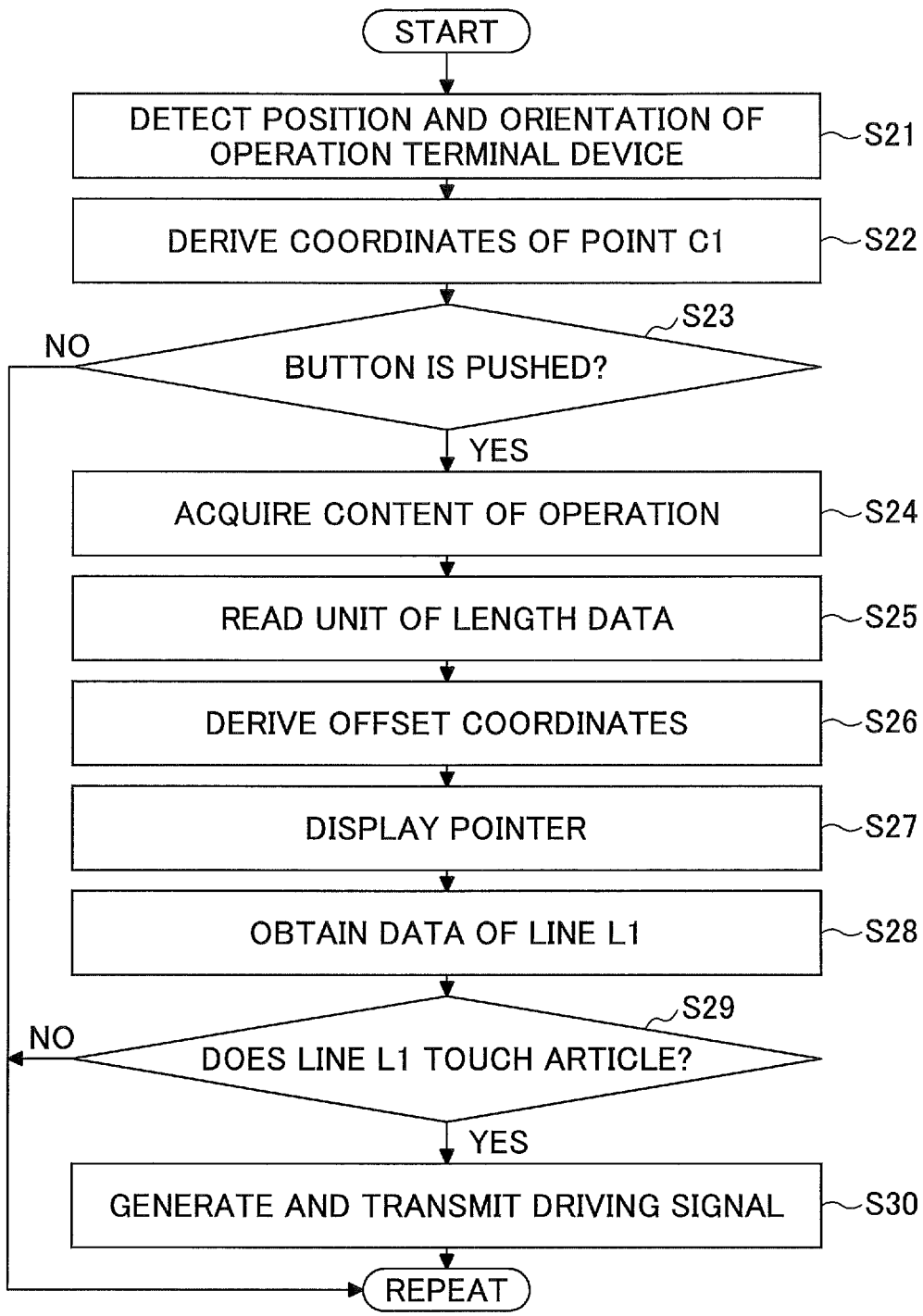
FIG. 16 is a flowchart describing a process performed in a processing apparatus according to the second embodiment.

FIG. 16 is a flowchart describing the process performed in the processing apparatus 120 according to the second embodiment. As an example, the case where articles 111 and 112 are displayed on the screen 110A will be described, as illustrated in FIG. 1.

When power of the processing apparatus 120 is turned on, the processing apparatus 120 acquires the article data and the vibration data from the data storage section 124 before starting the process illustrated in FIG. 16. The processing apparatus 120 generates image signals using the article data, to cause the projecting apparatus 110B to project images. As a result, stereoscopic images of the articles 111 and 112 are displayed on the screen 110A. The images of the articles 111 and 112 displayed on the screen 110A represent virtual objects which exist in the virtual space. These process described here is performed by the image output section 123.

After performing the process described above, the processing apparatus 120 starts processing illustrated in FIG. 16 (start).

The processing apparatus 120 detects a position and an orientation of the operation terminal device 230 in the real space (step S21). The step S21 is performed by the position detecting section 121.

The processing apparatus 120 calculates the coordinates of the point C1 in the virtual space (step S22). The coordinates of the point C1 are the coordinates before offset. The coordinates of the point C1 are calculated by the pointer calculating section 127.

The processing apparatus 120 determines whether the button 234R, 234L, 234F, or 234B is pushed or not (step S23). The step S23 is performed by the pointer calculating section 127 in the processing apparatus 120, in response to receiving a result of determination performed in the button determining section 237.

If it is determined that the button 234R, 234L, 234F, or 234B is pushed (step S23: YES), the processing apparatus 120 acquires, from the operation terminal device 230 via wireless communication, a content of the operation which includes information identifying which button was pushed among the buttons 234R, 234L, 234F, or 234B, and length of time that the button was pushed (step S24).

The processing apparatus 120 reads, from the data storage section 124, data representing unit of length (step S25). The data representing the unit of length represents an amount of movement of the coordinates of the pointer 130A per unit of time when the button 234R, 234L, 234F, or 234B is pushed. For example, the unit of length is set to 10 mm per second (when the button is pushed for 1 second, the pointer 130A will be moved 10 mm).

The processing apparatus 120 calculates the offset amount based on the content of the operation acquired at step S24 and the data representing the unit of length obtained at step S25, to calculate the coordinates of the point C2 in the virtual space by adding the offset amount to the coordinates of the point C1 (step S26). The coordinates of the point C2 are the offset coordinates. The coordinates of the point C2 are calculated by the pointer calculating section 127.

When the button 234R is pushed for 1 second for example, the offset amount will be 10 mm in the right direction.

Data representing the coordinates of the point C2 are entered into the contact determining section 122 and the image output section 123.

The processing apparatus 120 causes the projecting apparatus 110B to display the pointer 130A on the screen 110A, based on the coordinates of the pointer 130A obtained at step S26 (step S27). The pointer 130A is displayed, for example, at the location represented by the coordinates of the point C2.

By performing the step S27, the pointer 130A which is offset is displayed on the screen 110A where the stereoscopic images of the articles 111 and 112 are displayed.

Also at step S27, the processing apparatus 120 may display the pointer 130A using an image data representing the pointer 130A. With respect to the data representing the pointer 130A, data similar to the article data of the article 111 or 112 may be prepared in advance. When the data is prepared in advance, the processing apparatus 120 may display the stereoscopic images of the pointer 130A using the data. However, if the processing apparatus 120 can display the pointer 130A without using the image data of the pointer, it is not required that the image data of the pointer 130A be stored in the data storage section 124.

The step S27 is performed by the image output section 123.

The processing apparatus 120 obtains the formula (line data) expressing the line L1 (step S28). The line data of the line L1 (hereinafter referred to as the "line L1 data") is calculated by the contact determining section 122 using the coordinate data of the points C1 and C2. Alternatively, the pointer calculating section 127 may calculate the line L1 data and output the line L1 data to the contact determining section 122.

The processing apparatus 120 determines whether the line L1 has touched the article 111 or 112 (step S29). The step S29 is performed by the contact determining section 122. Based on the article data of the articles 111 and 112, and the line L1 data obtained at step S28, the contact determining section 122 determines whether the line L1 has touched the article 111 or 112.

Whether the article 111 or 112 is touched by the line L1 or not may be determined by checking if there is an intersection of the line L1 and the article 111 or 112.

Alternatively, whether the article 111 or 112 is touched by the line L1 or not may be determined by checking if distance between the coordinates represented by the line L1 data and the coordinates included in the article that is closest to the line L1 is not more than a given value. If the method of checking the distance between the coordinates represented by the line L1 data and the coordinates included in the article that is closest to the line L1 not being more than a given value is preferred from the perspective of the operability of the operation terminal device 230 in the simulation system according to the second embodiment, the method of checking the distance between the coordinates represented by the line L1 data and the coordinates included in the article that is closest to the line L1 may be adopted.

Next, the process performed at step S30 will be described. In describing the process at step S30, it is assumed that the line L1 has touched the article 111. However, when the line L1 has touched the article 112, a similar process is performed.

When the processing apparatus 120 determines that the line L1 has touched the article 111 (S29: YES), the processing apparatus 120 reads the vibration intensity and the vibrating time from the vibration data, generates a driving signal for driving the vibrating element 233R, 233L, 233F, or 233B of the operation terminal device 230, and transmits the driving signal to the operation terminal device 230 via the communicating section 126 (step S30). As a result, the vibrating element 233R, 233L, 233F, or 233B of the operation terminal device 230 are driven. The step S30 is performed by the drive controlling section 125.

When the pointer 130A approaches the article 111 from the back side and the front side of the line L1 touches the article 111, the vibrating element 233F disposed on the front side of the operation terminal device 230 may be driven.

When the pointer 130A approaches the article 111 from the front side and the back side of the line L1 touches the article 111, the vibrating element 233B disposed on the back side of the operation terminal device 230 may be driven.

When the pointer 130A approaches the article 111 from the left side and the right side of the line L1 touches the article 111, the vibrating element 233R disposed on the right side of the operation terminal device 230 may be driven.

When the pointer 130A approaches the article 111 from the right side and the left side of the line L1 touches the article 111, the vibrating element 233L disposed on the left side of the operation terminal device 230 may be driven.

After finishing step S30, the process is repeated from the start (repeat).

If it is determined at step S29 that the line L1 has not touched the article 111 or 112 (S29: NO), the process reverts to step S21.

As described above, in the simulation system according to the second embodiment, the user can operate the pointer 130A whose display location is offset using the operation terminal device 230. Hence, a case where the pointer 130A is hidden behind the operation terminal device 230 is less likely to occur, and the visibility of the pointer 130A will improve.

Accordingly, the simulation system with a good operability can be provided.

Also in the simulation system according to the second embodiment, when the line L1 extending from the pointer 130A operated with the operation terminal device 230 has touched an article such as the article 111 or 112 in the image projected on the screen 110A, the vibrating element 233R, 233L, 233F, or 233B is vibrated.

Therefore, the user can recognize that contact has occurred only by the tactile sensation.

Also in the simulation system according to the second embodiment, one of the vibrating elements 233R, 233L, 233F, and 233B is vibrated, in accordance with the direction from which the line L1, extending from the pointer 130A operated with the operation terminal device 230, touches an article.

Therefore, the user can recognize the direction from which the line L1 extending from the pointer 130A touches an article.

Figure 17:
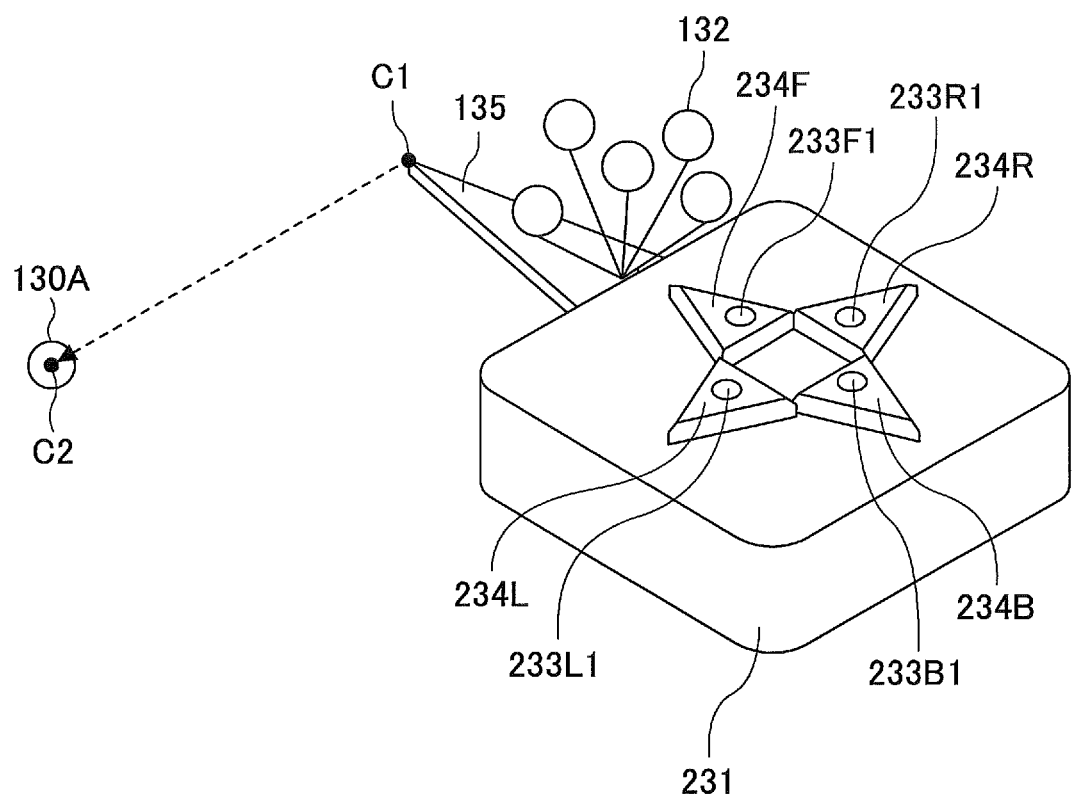
FIGS. 17 and 18 are diagrams illustrating modified examples of the second embodiment.
Figure 18:
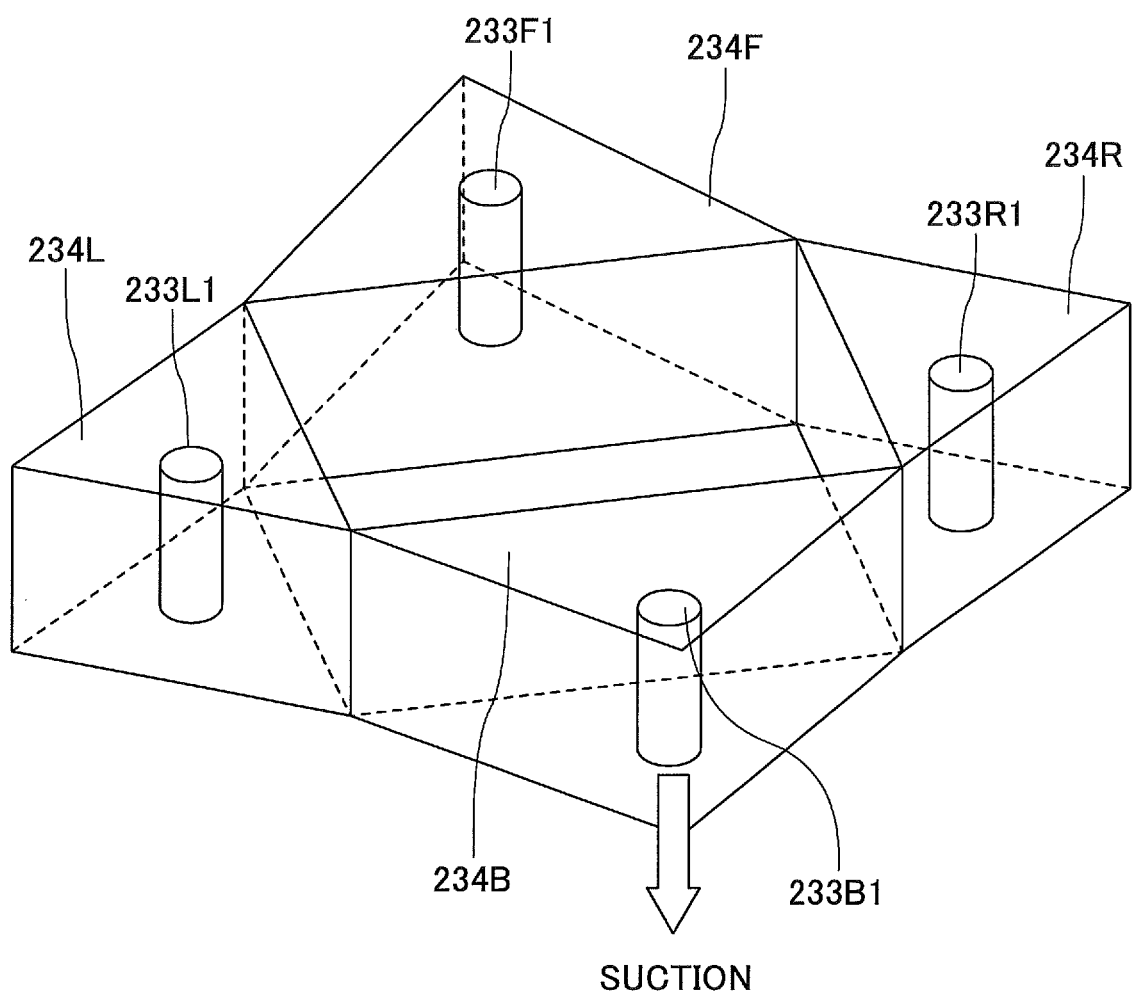

FIGS. 17 and 18 are diagrams illustrating modified examples of the second embodiment.

An operation terminal device 230A illustrated in FIG. 17 is made by changing the vibrating elements 233R, 233L, 233F, and 233B of the operation terminal device 230 illustrated in FIG. 14 into suction elements 233R1, 233L1, 233F1, and 233B1. Each of the suction elements 233R1, 233L1, 233F1, and 233B1 is a suction port, and a suction mechanism like a vacuum apparatus for suction is connected at the bottom of each of the suction elements 233R1, 233L1, 233F1, and 233B1.

Each suction mechanism of the suction elements 233R1, 233L1, 233F1, and 233B1 operates independently. The suction elements 233R1, 233L1, 233F1, and 233B1 may be controlled similarly to the vibrating elements 233R, 233L, 233F, and 233B.

The operation terminal device 230A may be used instead of the operation terminal device 230 illustrated in FIG. 14.

Third Embodiment

Figure 19:
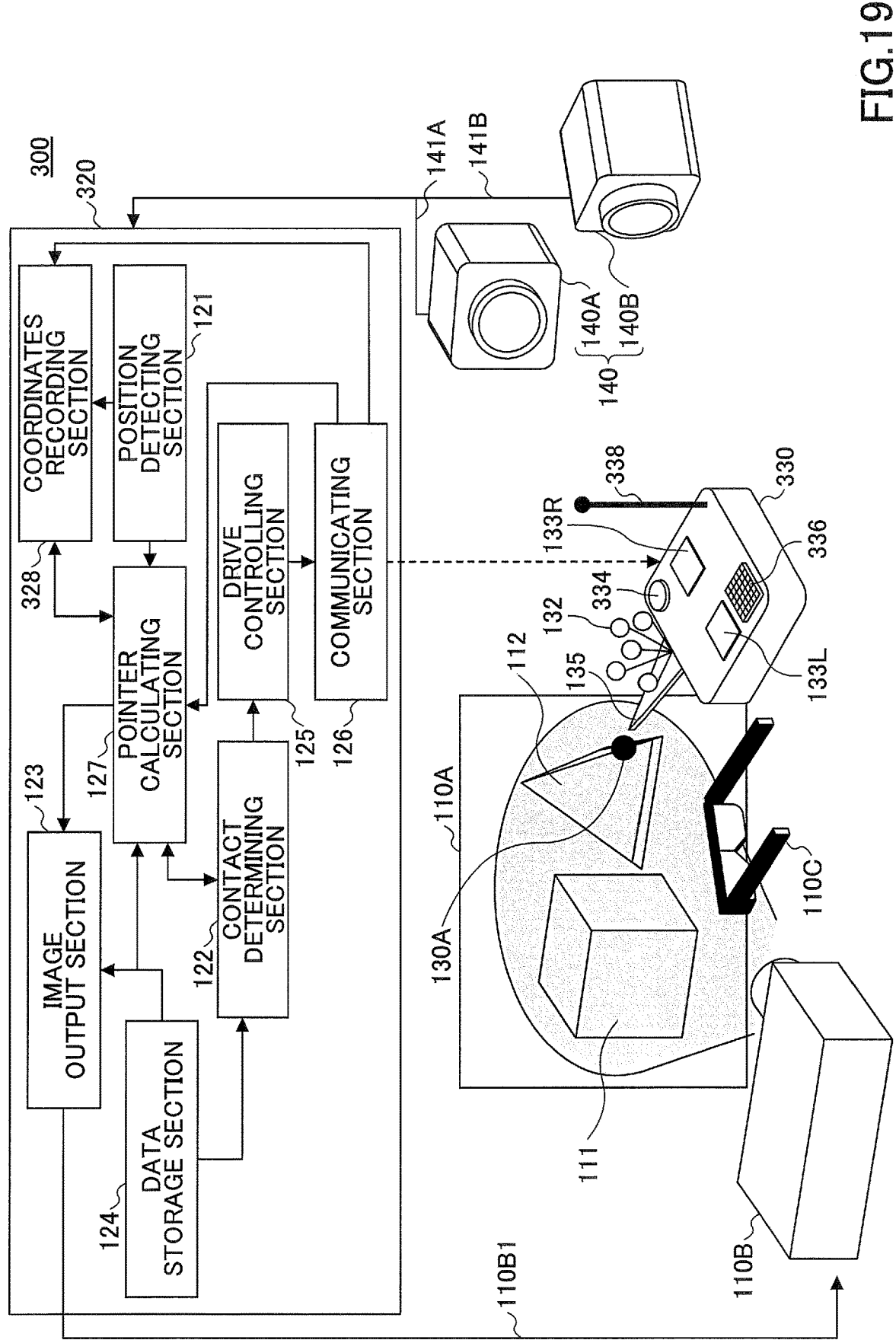
FIG. 19 is a diagram illustrating a simulation system according to a third embodiment.

FIG. 19 is a diagram illustrating a simulation system 300 according to a third embodiment.

The simulation system 300 includes a screen 110A, a projecting apparatus 110B, 3 Dimension (3D) glasses 110C, a processing apparatus 320, an operation terminal device 330, and a position measuring apparatus 140.

The processing apparatus 320 includes a position detecting section 121, a contact determining section 122, an image output section 123, a data storage section 124, a drive controlling section 125, a communicating section 126, a pointer calculating section 127, and a coordinates recording section 328. The processing apparatus 320 may be embodied, for example, by a computer including a memory.

The coordinates recording section 328 records, for each predetermined time, coordinates of the marker 132 in the virtual space which are obtained by converting a position of the marker 132 in the real space into the coordinates in the virtual space. The coordinates recording section 328 outputs data representing the recorded coordinates to the pointer calculating section 127.

Figure 20:
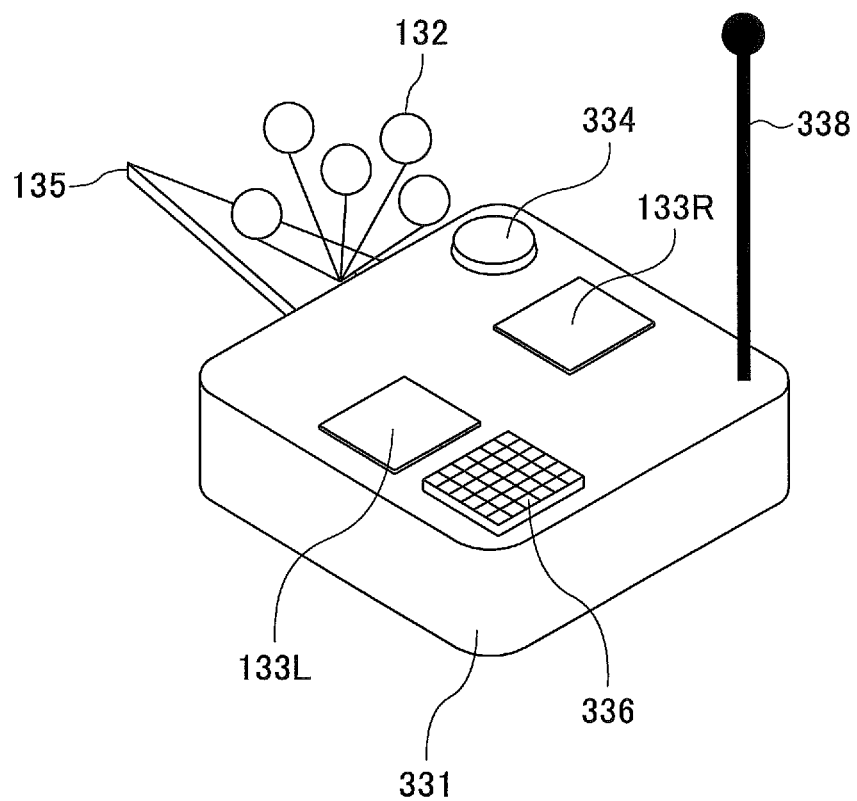
FIG. 20 is a perspective view illustrating an operation terminal device according to the third embodiment.

FIG. 20 is a perspective view illustrating the operation terminal device 330.

The operation terminal device 330 includes a housing 331, a marker 132, vibrating elements 133R and 133L, a button 334, a guide bar 135, a time recording unit 336, and an antenna 338. In the following description, with respect to the components same as the components in the operation terminal device 130 according to the first embodiment illustrated in FIG. 4, the same symbols are attached and the explanation about the components is omitted.

The housing 331 is, for example, made of resin, and is a suitable size for the user to hold in his/her hand. The vibrating elements 133R and 133L, the button 334, the time recording unit 336, and the antenna 338 are arranged on the upper surface of the housing 331. However, the time recording unit 336 may be placed inside the housing 331.

A function of the operation terminal device 330 is assigned to the button 334, so that the user can control the function using the button 334. Multiple buttons may be disposed on the housing 331. Examples of the functions assigned to the button 334 are, a function to cause the time recording unit 336 to record time, and a function to cause the operation terminal device 330 to send data recorded in the time recording unit 336 to the processing apparatus 320.

The time recording unit 336 is configured to record the time when the button 334 is pushed. The time recording unit 336 may be embodied, for example, by a CPU chip including a memory.

The antenna 338 is used for wireless communication in compliance with, for example, Bluetooth, Wi-Fi, Xbee, or ZigBee standard. In the third embodiment, a state is kept such that a connection between the operation terminal device 330 and the processing apparatus 320 is established. Therefore, the operation terminal device 330 and the processing apparatus 320 are always in the state in which data communication via wireless communication is available.

Figure 21:
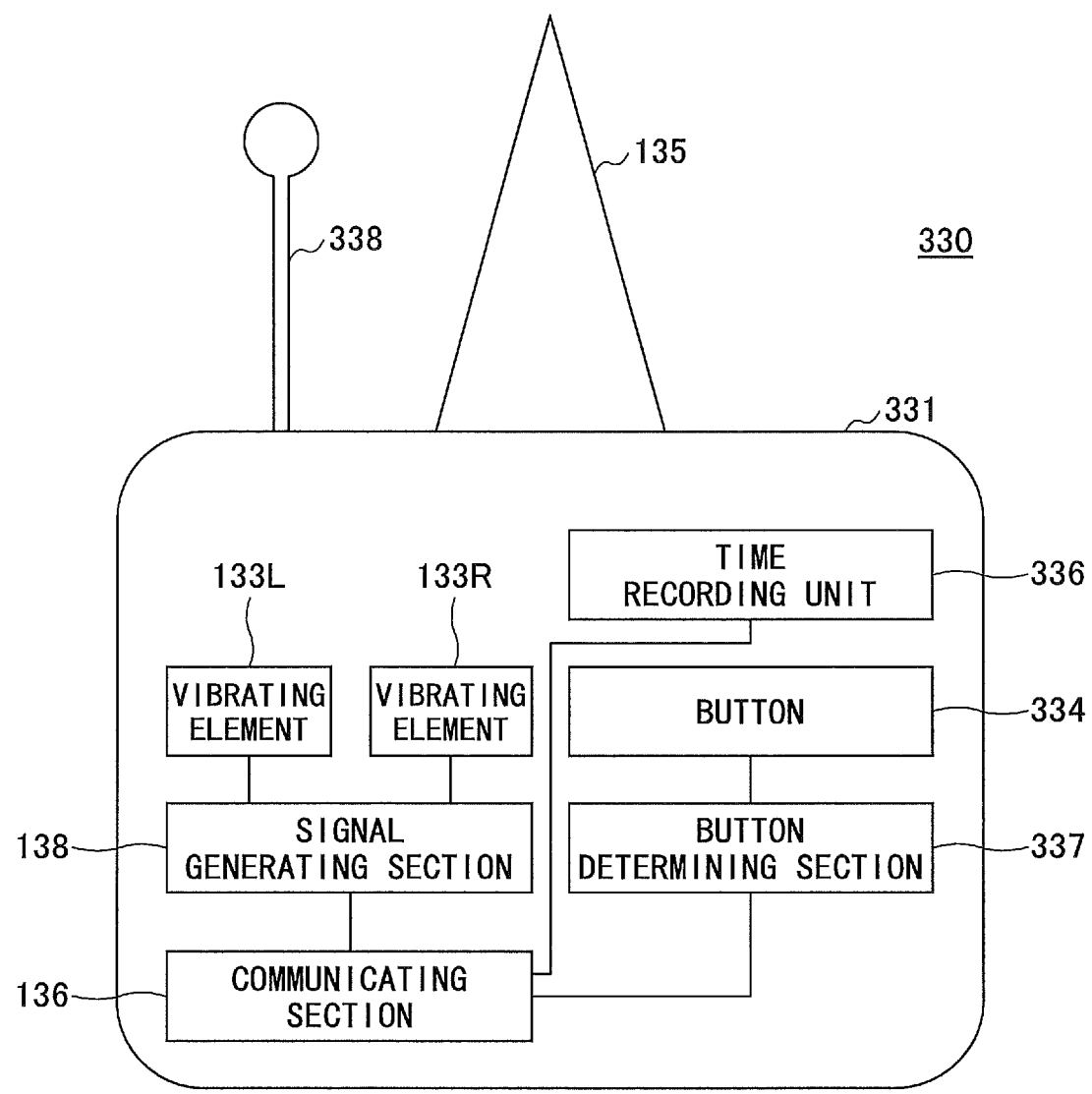
FIG. 21 is a diagram illustrating a configuration of an electrical system in the operation terminal device according to the third embodiment.

FIG. 21 is a diagram illustrating a configuration of an electrical system in the operation terminal device 330. In FIG. 21, the housing 331 and the guide bar 135 are illustrated in a simplified manner and the marker 132 is omitted.

The operation terminal device 330 includes the vibrating elements 133R and 133L, the button 334, the communicating section 136, a button determining section 337, a signal generating section 138, the time recording unit 336, and the antenna 338. The button determining section 337 and the signal generating section 138 are embodied by a processing device such as a microcomputer.

The button determining section 337 and the signal generating section 138 are coupled to the communicating section 136. Further the time recording unit 336 is coupled to the communicating section 136. The communicating section 136 is a communicating section to perform wireless communication with the communicating section 126 in the processing apparatus 320. The communicating section 136 constantly performs wireless communication in compliance with, for example, Bluetooth, Wi-Fi, Xbee, or ZigBee standard.

The communicating section 136 transmits a signal entered from the button determining section 337 to the processing apparatus 320. Further, the communicating section 136 receives a driving signal generated by the drive controlling section 125 of the processing apparatus 320, and outputs the driving signal to the signal generating section 138. Further, the communicating section 136 sends the data recorded in the time recording unit 336 to the processing apparatus 320.

The time recording unit 336 records time information at the time when the button 334 is operated. More specifically, when the button 334 is pushed for the first time, the time recording unit 336 records time as a start time Ts, which is a time to start generating locus data. Further, when the button 334 is pushed for the second time, the time recording unit 336 records time as an end time Te, which is a time to terminate generating the locus data.

The button determining section 337 is a determining section to determine whether the button 334 is operated or not. The button determining section 337 determines contents of the operation, for example, the operation to cause the time recording unit 336 to record time Ts or Te, the operation to cause the operation terminal device 330 to send data recorded in the time recording unit 336 to the processing apparatus 320, and the like. The button determining section 337 outputs a signal representing contents of the operation to the communicating section 136.

The signal generating section 138 amplifies a driving signal received by the communicating section 136 to drive the vibrating element 133R or 133L. Note that the signal generating section 138 may be regarded as a part of the drive controlling section.

Figure 22:
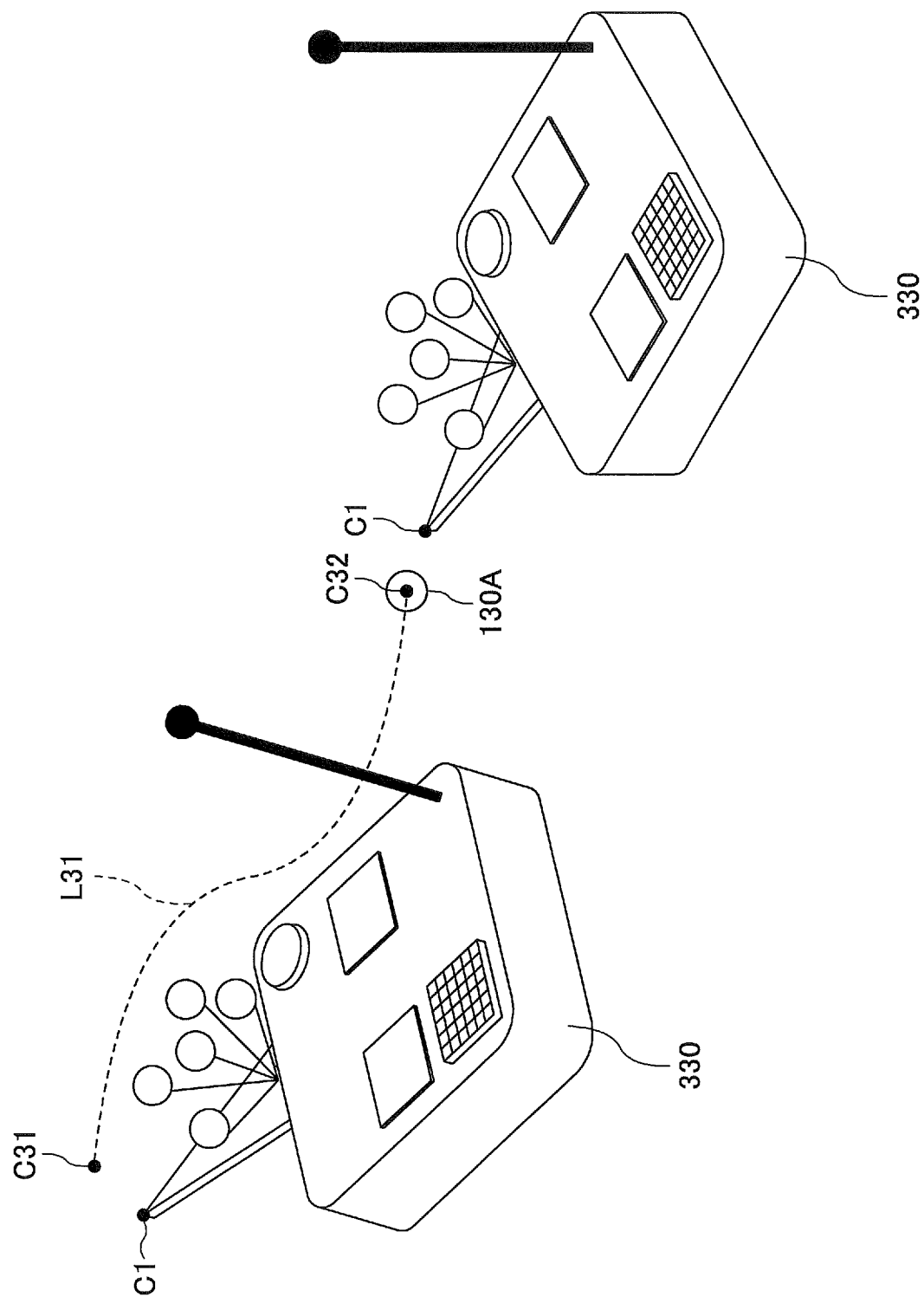
FIG. 22 is a diagram illustrating a line represented by line data used in the third embodiment.

FIG. 22 is a diagram illustrating the line represented by line data. In FIG. 22, in addition to the line L31 and the pointer 130A existing in the virtual space which is represented by an image projected on the screen 110A, the operation terminal device 330 existing in the real space is illustrated.

The line L31 existing in the virtual space is a curved line connecting a point C31 and a point C32. The point C31 represents a position which is offset from a point C1 located at the operation terminal device 330 at the left side in FIG. 22. Definition of the point C1 is the same as that described in the first embodiment, that is, the point C1 on the operation terminal device 330 located at the left side in FIG. 22 means the position represented by the coordinates before offset which are derived from the position of the operation terminal device 330 located at the left side in FIG. 22. Therefore, the point C31 is the position represented by the offset coordinates. The point C31 is offset so as not to be hidden by the operation terminal device 330.

Similarly, the point C32 represents a position which is offset from the point C1 on the operation terminal device 330 located at the right side in FIG. 22. The point C32 can also be regarded as a position which is further offset from the point C31.

In FIG. 22, the pointer 130A is displayed at the point C32.

The line L31 represents a locus from the point C31 to the point C32. When the operation terminal device 330 illustrated in FIG. 22 is moved by the user so as to draw a reverse S-shaped curve, the locus from the point C31 to the point C32 (line L31) can be obtained.

The locus represented by the line L31 can be obtained by recording the coordinates in the virtual space corresponding to the position of the marker 132 in the real space every time a predetermined time is passed while the operation terminal device 330 is moving.

The simulation system 300 according to the third embodiment displays the line L31 connecting the point C31 and the point C32 which are respectively the points offset from the point C1 of the operation terminal device 330 illustrated at the left side in FIG. 22 and the point C1 of the operation terminal device 330 illustrated at the right side in FIG. 22, in addition to the pointer 130A. The simulation system 300 further determines whether the line L31 touches an article or not. If the line L31 touches an article, the simulation system 300 vibrates the vibrating element 133R or 133L.

In the following description, let the coordinates of the point C31 and the coordinates of the point C32 be (X31, Y31, Z31) and (X32, Y32, Z32), respectively.

How to obtain the locus will be described later.

Figure 23:
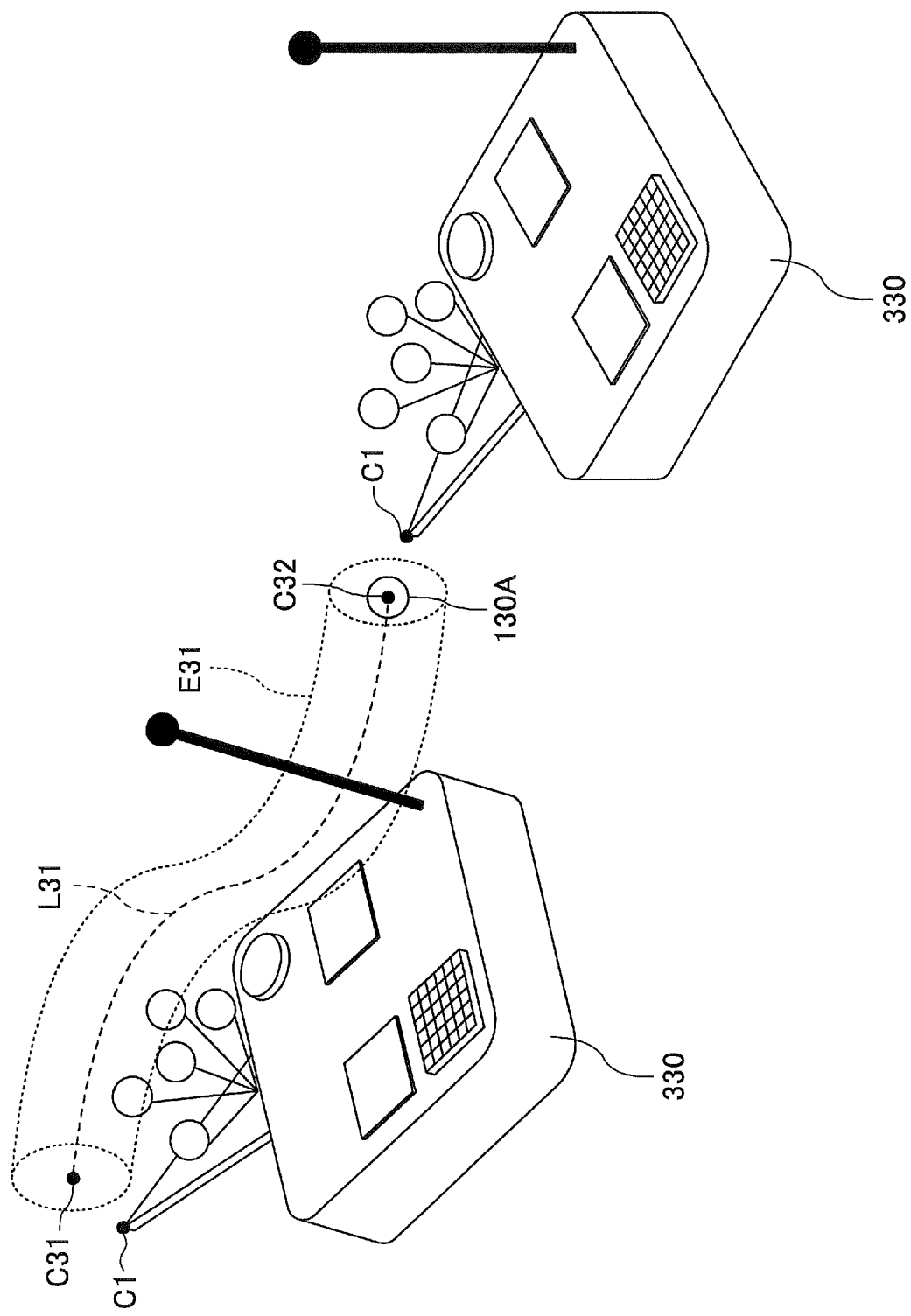
FIG. 23 is a diagram illustrating a modified example of FIG. 22.

FIG. 23 is a diagram illustrating a modified example of FIG. 22.

As illustrated in FIG. 23, the simulation system 300 may define a deformed cylindrical region E31 whose center axis is the line L31, and may determine whether the deformed cylindrical region E31 touches an article or not. A radius of the deformed cylindrical region E31 may be set as appropriate in accordance with a purpose for a use of the simulation system 300. For example, when the length of the line L31 is 30 cm, the radius of E31 may be set to 1.5 cm.

Figure 24:
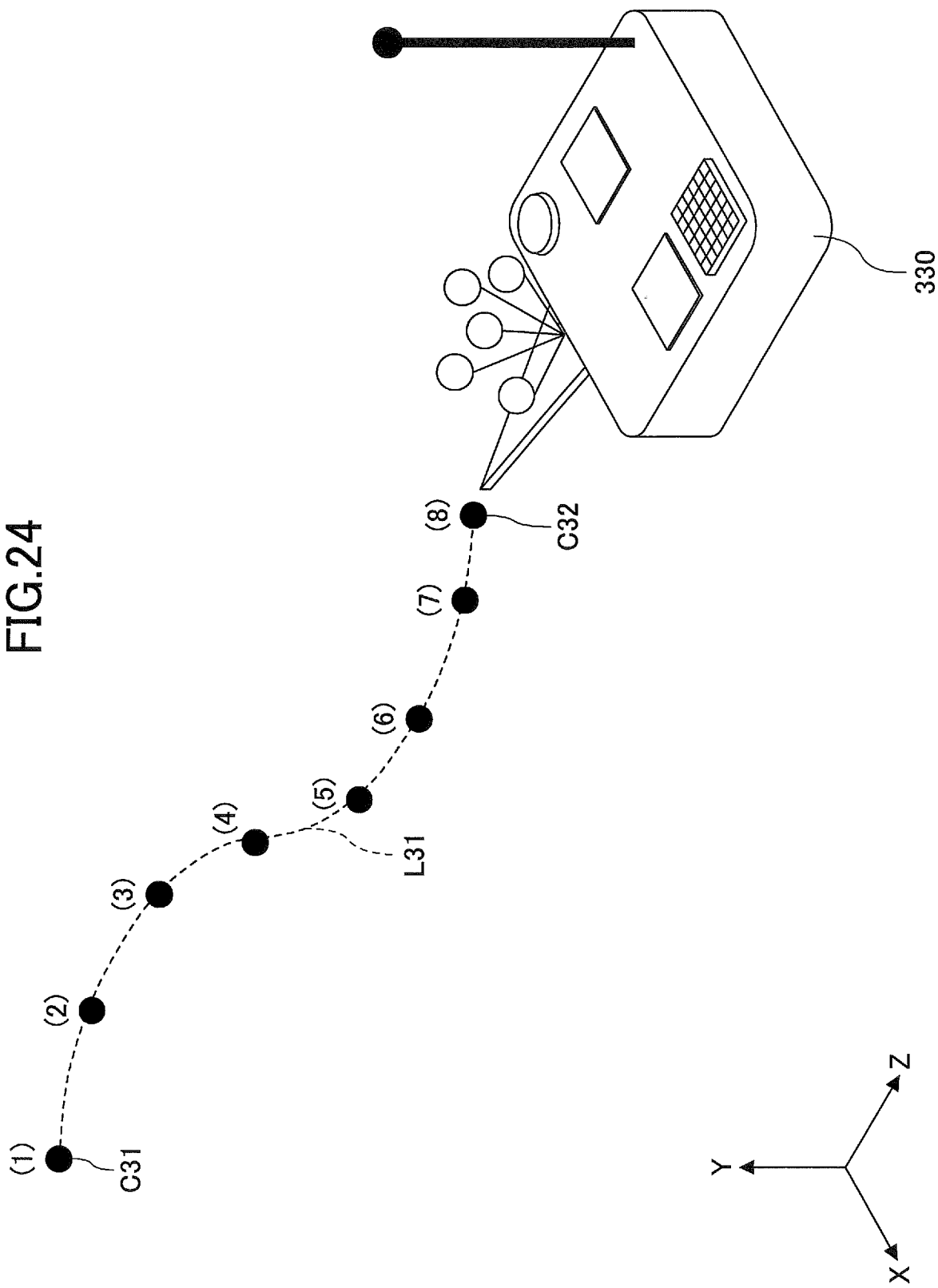
FIG. 24 is a diagram illustrating the line used in the third embodiment.

FIG. 24 is a diagram illustrating the line L31. And, FIG. 25 is a table illustrating data representing the line L31.

As illustrated in FIG. 24, while the offset coordinates move from the point C31 to the point C32 in accordance with curved movement of the operation terminal device 330, the simulation system 300 records time in the time recording unit 336. The recording of time is performed each time when the offset coordinates of the operation terminal device 330 are located at each point from (1) to (8). Note that the point (1) corresponds to the point C31 and that the point (8) corresponds to the point C32.

The operation terminal device 330 transmits time data representing the time recorded in the time recording unit 336 to the processing apparatus 320. In the processing apparatus 320, the coordinate data of the offset coordinates in the virtual space corresponding to the position of the marker 132 in the real space is stored in the coordinates recording section 328 by correlating with time when the coordinate data is obtained. Therefore, data illustrated in FIG. 25 can be obtained by extracting coordinate data corresponding to the time included in the time data, among the coordinate data recorded in the time recording unit 336.

As illustrated in FIG. 25, the set of the coordinates of the points (1) to (8) and the times when the coordinates of the points (1) to (8) are calculated is obtained. FIG. 25 illustrates an example in which the coordinates of the points (1) to (8) are obtained every second.

The data illustrated in FIG. 25 represents the locus including the points (1) to (8) illustrated in FIG. 24.

FIG. 26 is a table illustrating data representing the deformed cylindrical region E31.

In expressing the deformed cylindrical region E31, range information for expressing thickness is included in the X coordinate data, Y coordinate data, or Z coordinate data.

The line L31 illustrated in FIG. 24 or the deformed cylindrical region E31 illustrated in FIG. 23 can be used, for example, for expressing an S-shaped tool. For example, the line L31 is a virtual tool having an S-shape ranging from the pointer 130A displayed at the point C32 to the point C31, which moves in the image displayed on the screen 110A in accordance with movement of the operation terminal device 330. With respect to the tool expressed by the cylindrical region E31, a similar operation can be performed.

By moving the line L31 or the deformed cylindrical region E31 in the virtual space, the user can simulate whether the S-shaped tool may come in contact with the article 111 or 112 in the virtual space.

Figure 27:
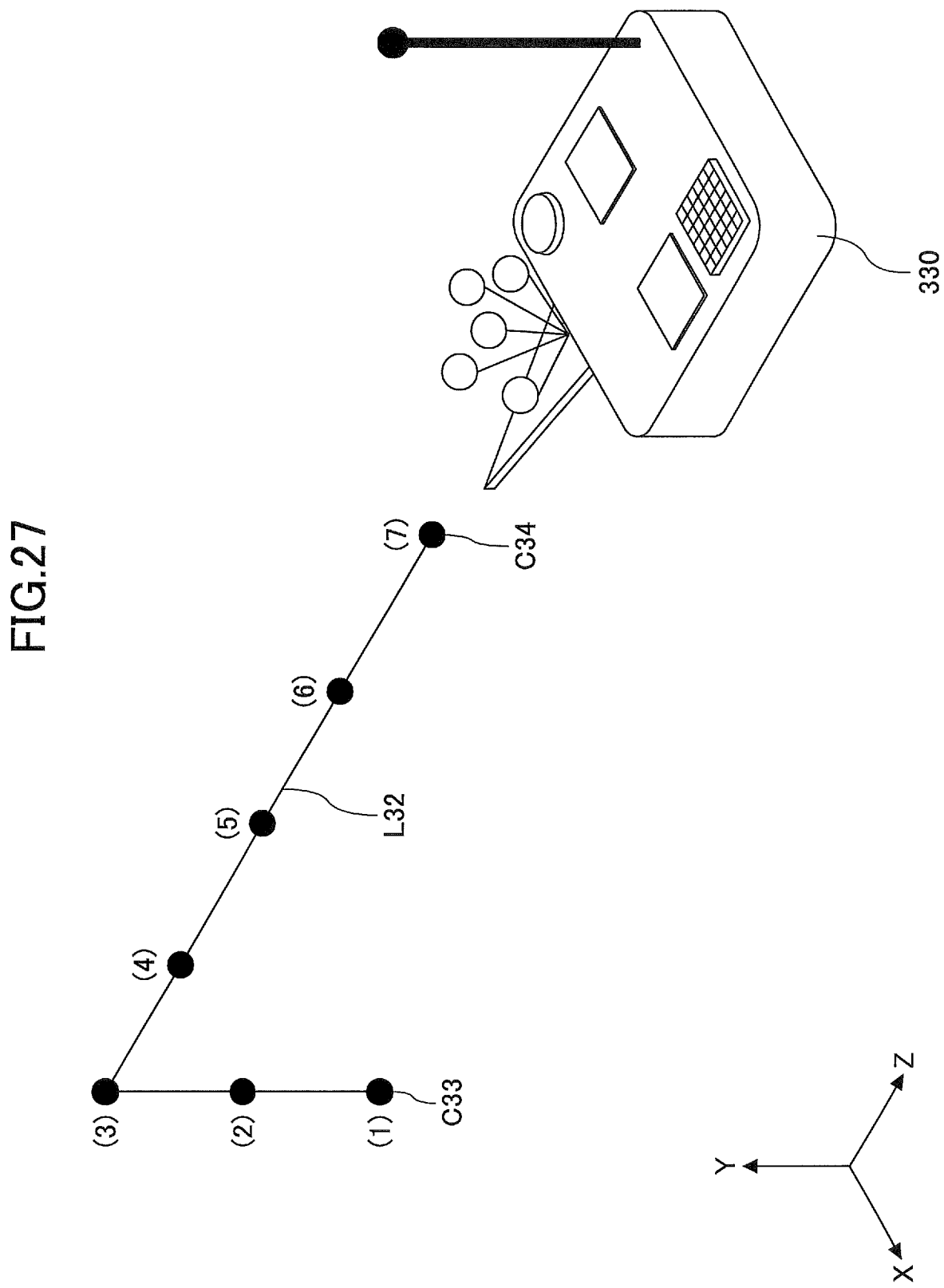
FIG. 27 is a diagram illustrating the line used in the third embodiment.

FIG. 27 is a diagram illustrating the line L32. And, FIG. 28 is a table illustrating data representing the line L32.

As illustrated in FIG. 27, while the offset coordinates move from the point C33 to the point C34 in accordance with zigzag movement of the operation terminal device 330, the simulation system 300 records time in the time recording unit 336. The recording of time is performed each time when the offset coordinates of the operation terminal device 330 are located at each point from (1) to (7). Note that the point (1) corresponds to the point C33 and that the point (7) corresponds to the point C34.

The operation terminal device 330 transmits time data representing the time recorded in the time recording unit 336 to the processing apparatus 320. In the processing apparatus 320, the coordinate data of the offset coordinates in the virtual space corresponding to the position of the marker 132 in the real space is stored in the coordinates recording section 328 by correlating with time when the coordinate data is obtained. Therefore, data illustrated in FIG. 28 can be obtained by extracting coordinate data corresponding to the time included in the time data, among the coordinate data recorded in the time recording unit 336.

As illustrated in FIG. 28, the set of the coordinates of the points (1) to (7) and the time when the coordinates of the points (1) to (7) are calculated is obtained. FIG. 28 illustrates an example in which the coordinates of the points (1) to (7) are obtained every second.

The data illustrated in FIG. 28 represents the zigzag locus including the points (1) to (7) illustrated in FIG. 24.

The line L32 illustrated in FIG. 27 can be used, for example, for expressing an L-shaped tool. By moving the line L32 using the operation terminal device 330, the user can simulate whether the L-shaped tool may come in contact with the article 111 or 112 in the virtual space.

Figure 29:
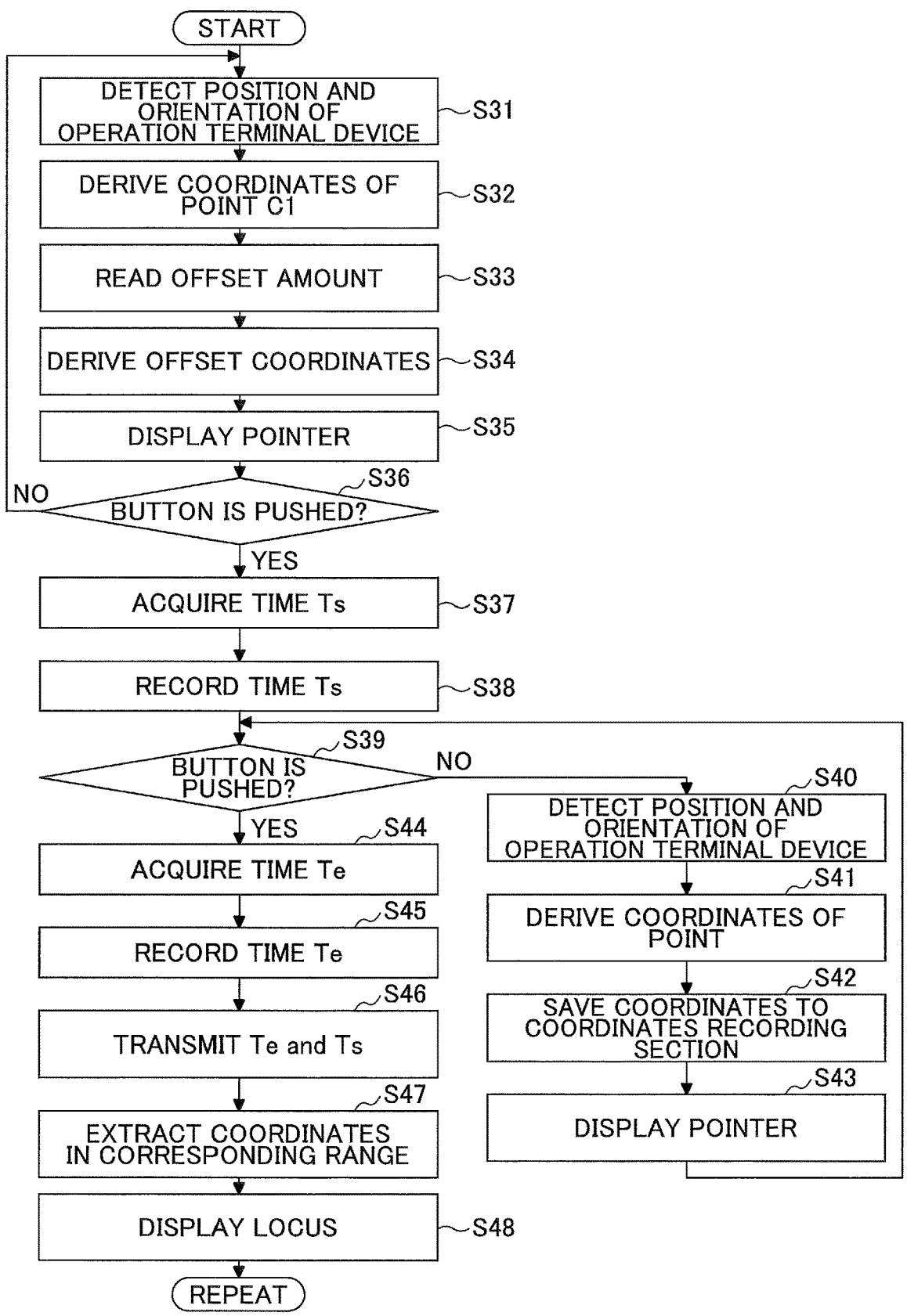
FIG. 29 is a flowchart describing a process performed in a processing apparatus according to the third embodiment.

FIG. 29 is a flowchart describing the process performed in the processing apparatus 320 according to the third embodiment. As an example, the case where articles 111 and 112 are displayed on the screen 110A will be described, as illustrated in FIG. 19.

When power of the processing apparatus 320 is turned on, the processing apparatus 320 acquires the article data and the vibration data from the data storage section 124 before starting the process illustrated in FIG. 29. The processing apparatus 320 generates image signals using the article data, to cause the projecting apparatus 110B to project images. As a result, stereoscopic images of the articles 111 and 112 are displayed on the screen 110A. The images of the articles 111 and 112 displayed on the screen 110A represent virtual objects which exist in the virtual space. The process described here is performed by the image output section 123.

The processing apparatus 320 detects a position and an orientation of the operation terminal device 330 in the real space (step S31). The step S31 is performed by the position detecting section 121.

The processing apparatus 320 calculates the coordinates of the point C1 in the virtual space (step S32). The coordinates of the point C1 are calculated by the pointer calculating section 127.

The processing apparatus 320 reads the offset amount from the data storage section 124 (step S33). The data representing the offset amount is stored in the data storage section 124 in advance.

The processing apparatus 320 calculates the coordinates of the point C31 in the virtual space by adding the offset amount to the coordinates of the point C1 (step S34). The positional relationship between the point C1 and the point C31 is as illustrated in FIG. 22. The coordinates of the point C31 are the offset coordinates. The coordinates of the point C31 are calculated by the pointer calculating section 127.

Data representing the coordinates of the point C31 is entered into the contact determining section 122 and the image output section 123.

The processing apparatus 320 causes the projecting apparatus 110B to display the pointer 130A on the screen 110A, based on the coordinates of the pointer 130A obtained at step S34 (step S35). The pointer 130A is displayed, for example, at the location represented by the coordinates of the point C31.

By performing the step S35, the pointer 130A is offset to be displayed on the screen 110A where the stereoscopic images of the articles 111 and 112 are displayed.

Also at step S35, the processing apparatus 320 may display the pointer 130A using an image data representing the pointer 130A. With respect to the data representing the pointer 130A, data similar to the article data of the article 111 or 112 may be prepared in advance. When the data is prepared in advance, the processing apparatus 320 may display the stereoscopic images of the pointer 130A using the data. The step S35 is performed by the image output section 123.

The processing apparatus 320 determines whether the button 334 is pushed or not (step S36). Since the processing apparatus 320 and the operation terminal device 330 are performing wireless communication each other, the processing apparatus 320 performs the determination at step S36 by obtaining a result of determination performed in the button determining section 337 via wireless communication.

If it is determined that the button 334 is pushed (step S36: YES), the processing apparatus 320 causes the operation terminal device 330 to acquire the time Ts (step S37). The time Ts is a time to start generating locus data. In the present description, an example will be described that the button 334 was pushed when the pointer 130A was at the point C31. The point C31 corresponds to the point (1) in FIG. 24.

The processing apparatus 320 causes the operation terminal device 330 to record the time Ts in the time recording unit 336 (step S38).

The processing apparatus 320 determines whether the button 334 is pushed or not (step S39). Here, in order to determine if a termination of the generation of the locus is instructed or not, the determination whether the button 334 is pushed or not is performed.

If it is determined that the button 334 is not pushed (step S39: NO), the processing apparatus 320 performs step S40 next.

The processing apparatus 320 detects a position and an orientation of the operation terminal device 330 in the real space (step S40). The step S40 is performed by the position detecting section 121.

The processing apparatus 320 calculates the coordinates in the virtual space corresponding to the position of the operation terminal device 330 detected at step S40, to calculate the offset coordinates (step S41). The coordinates are calculated by the pointer calculating section 127.

The processing apparatus 320 saves the coordinates calculated at step S41 in the coordinates recording section 328 (step S42). The coordinates calculated at step S41 are saved with data representing the time when the position of the operation terminal device 330 is detected by the position detecting section 121.

The processing apparatus 320 causes the projecting apparatus 110B to display the pointer 130A at the position corresponding to the coordinates obtained at step S42 (step S43). For example, when the operation terminal device 330 is moved from the point (1) to the point (2) illustrated in FIG. 24, the pointer 130A is displayed at the point (2). The step S43 is performed by the image output section 123.

After the step S43 is finished, the process reverts to step S39.

Until it is determined that the button 334 was pushed (step S39: YES), the processing apparatus 320 performs the steps S40 to S43 repeatedly. As a result, for example, data including the coordinates corresponding to the points (1) to (7) illustrated in FIG. 24 is recorded in the coordinates recording section 328.

If it is determined that the button 334 is pushed at step S39 (step S39: YES), the processing apparatus 320 causes the operation terminal device 330 to acquire the time Te (step S44). The time Te is a time to terminate generating the locus data. In the present description, an example will be described in which the button 334 was pushed when the pointer 130A was at the point C32. The point C32 corresponds to the point (8) in FIG. 24.

The processing apparatus 320 causes the operation terminal device 330 to record the time Te into the time recording unit 336 (step S45).

The processing apparatus 320 causes the operation terminal device 330 to send the time Ts and Te (step S46).

The processing apparatus 320 extracts the coordinate data corresponding to the time range between the time Ts and Te from coordinates recording section 328 (step S47). By performing the step S47, the data as illustrated in FIG. 25 is obtained.

The processing apparatus 320 displays the locus on the screen 110A using the coordinate data obtained at step S47. At step S48, the locus represented by the line L31 illustrated in FIG. 22 or FIG. 24 is displayed on the screen 110A.

Accordingly, the user can check whether the line L31 may come in contact with the article 111 or 112 in the virtual space, by moving the operation terminal device 330.

As described above, in the simulation system 300 according to the third embodiment, the user can operate the pointer 130A, the display location of which is offset, using the operation terminal device 330. Hence, a case in which the pointer 130A is hidden behind the operation terminal device 330 is less likely to occur, and the visibility of the pointer 130A will improve.

Accordingly, the simulation system 300 with a good operability can be provided.

Further, in the simulation system 300 according to the third embodiment, the user can generate data representing a desired locus, by moving the operation terminal device 330. Since both ends of the locus are located at the offset coordinates, a case where the pointer 130A or the locus is hidden behind the operation terminal device 330 is less likely to occur, and the visibility will improve.

Accordingly, the user can try moving the desired locus in the virtual space, by moving the operation terminal device 330.

Note that the offset amount may be set to zero. In a case where the pointer 130A or the locus is not hidden behind the operation terminal device 330 even if the offset amount is zero, the offset amount may be set to zero because the visibility will not be degraded. In this case, the point C1 and the point C31 illustrated in FIG. 22 coincide with each other.

Fourth Embodiment

Figure 30:
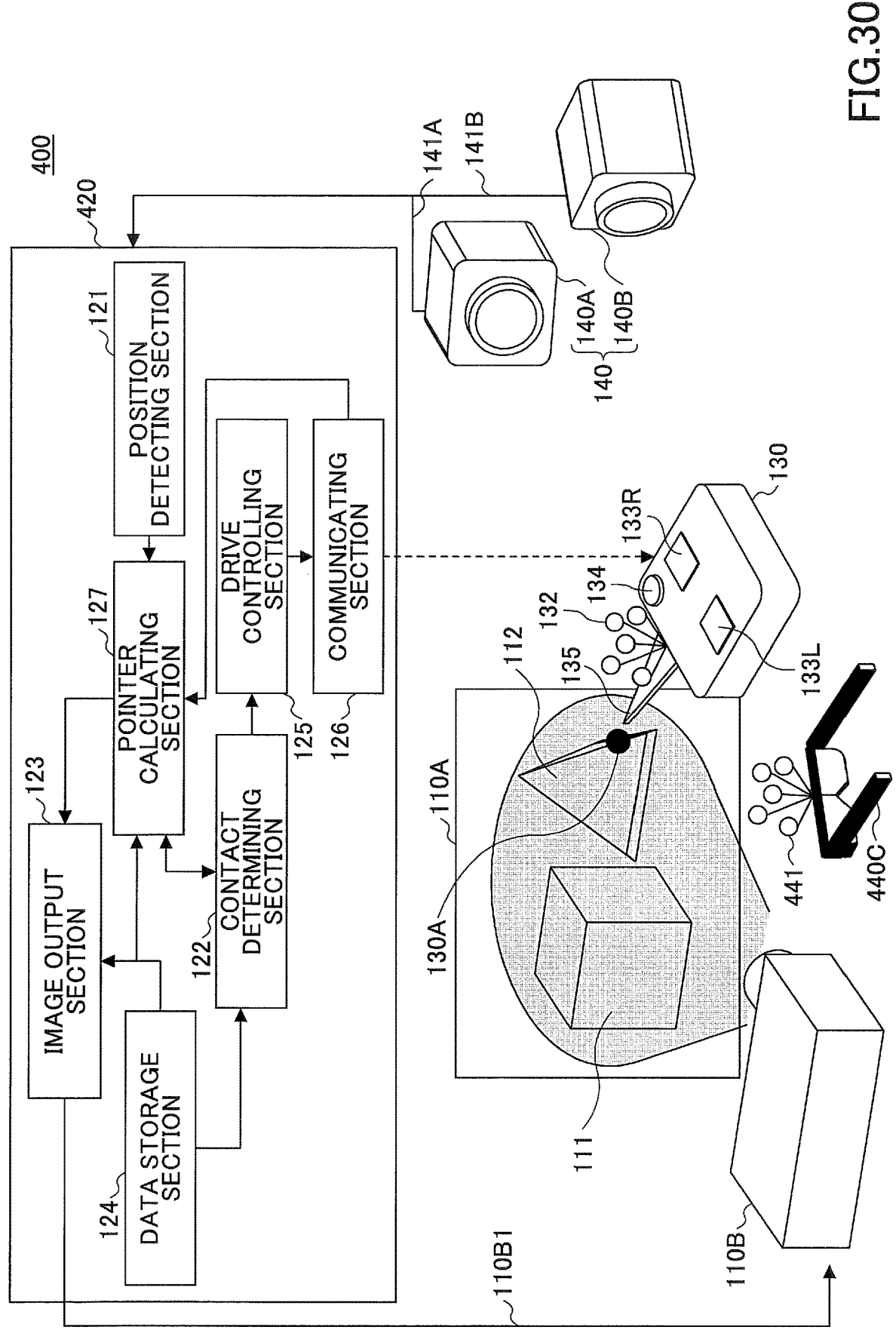
FIG. 30 is a diagram illustrating a simulation system according to a fourth embodiment.

FIG. 30 is a diagram illustrating a simulation system 400 according to a fourth embodiment.

The simulation system 400 includes a screen 110A, a projecting apparatus 110B, 3 Dimension (3D) glasses 440C, a processing apparatus 420, an operation terminal device 130, and a position measuring apparatus 140. The 3D glasses 440C are made by attaching a marker 441 to the 3D glasses 110C according to the first embodiment.

The processing apparatus 420 includes a position detecting section 121, a contact determining section 122, an image output section 123, a data storage section 124, a drive controlling section 125, a communicating section 126, and a pointer calculating section 127. The processing apparatus 420 may be embodied, for example, by a computer including a memory.

The position detecting section 121 performs image processing such as pattern matching with respect to image data input from the position measuring apparatus 140 to detect a position and an orientation of the operation terminal device 130. The position of the operation terminal device 130 is expressed as coordinates in a 3-dimensional coordinate space, and the orientation of the operation terminal device 130 is expressed as angles to each axis (three axes) of the 3-dimensional coordinate space.

The position detecting section 121 detects a position and an orientation of the marker 441 of the 3D glasses 440C in a similar method to the method of detecting the position and the orientation of the marker 132 of the operation terminal device 130.

Figure 31:
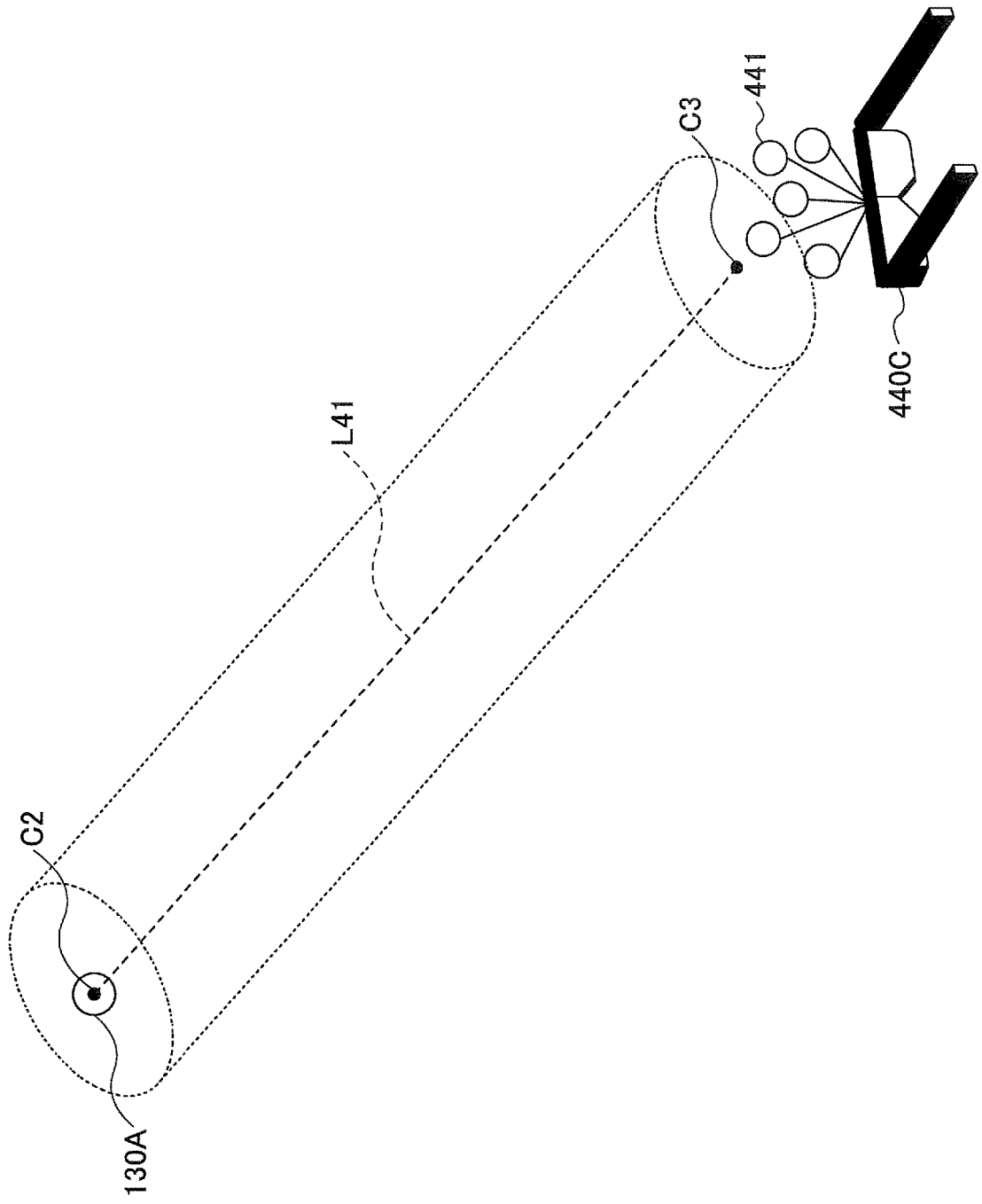
FIG. 31 is a diagram illustrating a positional relationship between a marker of 3D glasses and a point.

FIG. 31 is a diagram illustrating a positional relationship between the marker 441 of the 3D glasses 440C and a point C2.

The point C2 is similar to the point C2 in the first embodiment. That is, the coordinates of the point C2 can be obtained by offsetting the coordinates of a point C1 corresponding to a position of the marker 132 of the operation terminal device 130.

The processing apparatus 420 derives a line L41 connecting a point C3 and the point C2. Note that the point C3 represents a position of the marker 441 of the 3D glasses 440C in the virtual space.

The line L41 is expressed by the following formula (2) when the coordinates of the point C3 are (X41, Y41, Z41) and the coordinates of the point C2 are (X42, Y42, Z42).

$$\frac{(X - X41)}{(X42 - X41)} = \frac{(Y - Y41)}{(Y42 - Y41)} = \frac{(Z - Z41)}{(Z42 - Z41)} \qquad (2)$$

The simulation system 400 determines whether the point C1 is on the line L41 using the formula (2). If the point C1 is on the line L41, the simulation system 400 further offsets the point C2 so that the point C1 is not on the line L41.

That is, if the operation terminal device 130 is positioned between a head of the user and the pointer 130A which is displayed at the offset coordinates, the pointer 130A is hidden behind the operation terminal device 130. Therefore in this case, the pointer 130A positioned at the point C2 is further offset.

Figure 32:
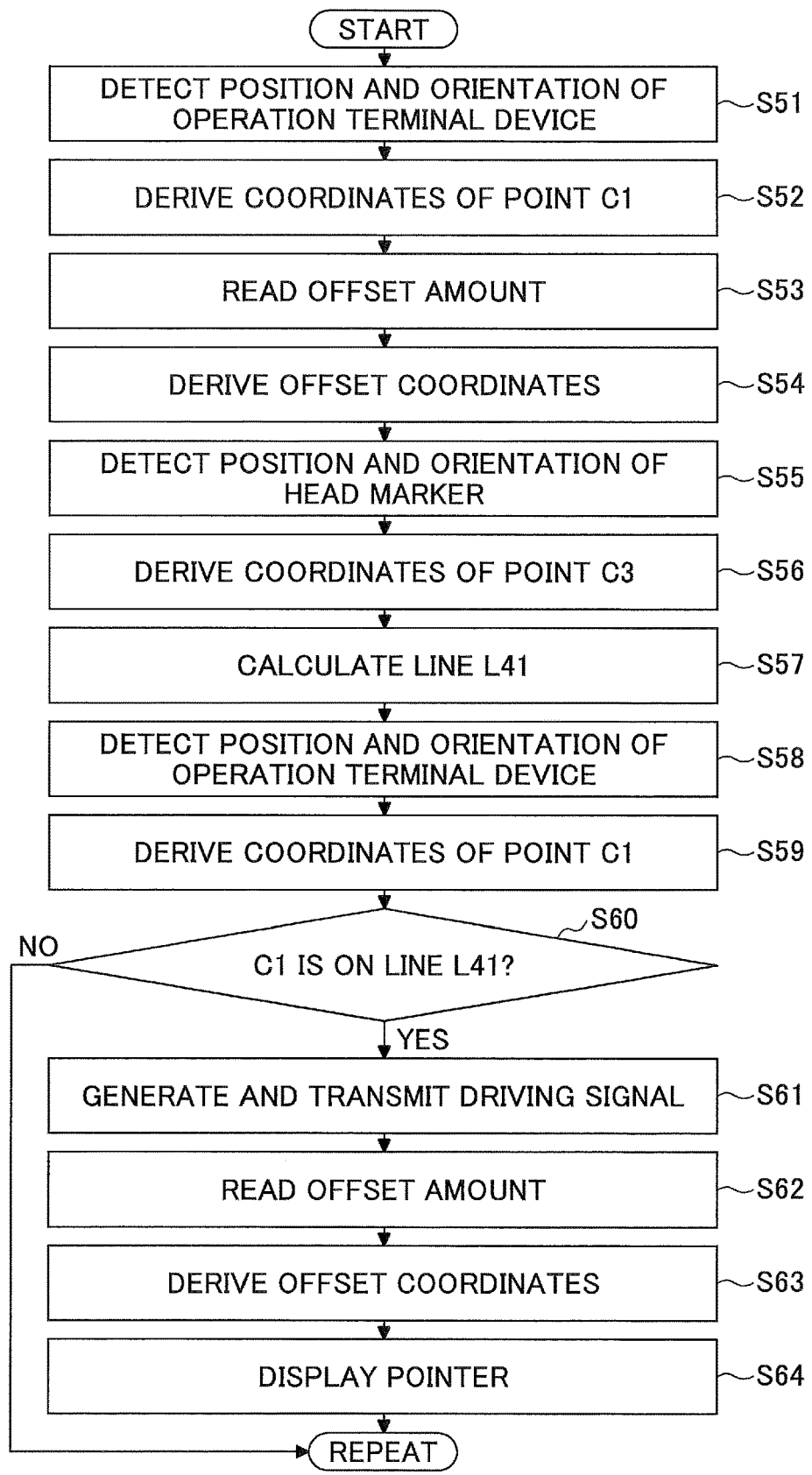
FIG. 32 is a flowchart describing a process performed in the fourth embodiment.

FIG. 32 is a flowchart describing the process performed in the fourth embodiment.

The processing apparatus 420 starts processing (start).

The processing apparatus 420 detects the position and the orientation of the operation terminal device 130 in the real space (step S51). The step S51 is performed by the position detecting section 121.

The processing apparatus 420 calculates the coordinates of the point C1 in the virtual space (step S52). The coordinates of the point C1 are the coordinates before offset, which are calculated by the pointer calculating section 127.

The processing apparatus 420 reads the offset amount from the data storage section 124 (step S53). The data representing the offset amount is stored in the data storage section 124 in advance.

The processing apparatus 420 calculates the coordinates of the point C2 in the virtual space by adding the offset amount to the coordinates of the point C1 (step S54). The coordinates of the point C2 are the offset coordinates. The coordinates of the point C2 are calculated by the pointer calculating section 127.

The processing apparatus 420 detects the position and the orientation of the marker 441 of the 3D glasses 440C in the real space (step S55). The step S55 is performed by the position detecting section 121.

The processing apparatus 420 calculates the coordinates of the point C3 in the virtual space (step S56). The coordinates of the point C3 represent a position in the virtual space which corresponds to the position of the marker 441 in the real space, which is calculated by the pointer calculating section 127.

The processing apparatus 420 obtains the formula expressing the line L41 (step S57). The line L41 is a line segment of a straight line whose endpoints are the points C2 and C3.

The processing apparatus 420 detects the position and the orientation of the operation terminal device 130 in the real space (step S58). The step S58 is performed by the position detecting section 121.

The processing apparatus 420 calculates the coordinates of the point C1 in the virtual space (step S59). The coordinates of the point C1 are the coordinates before offset, which are calculated by the pointer calculating section 127.

While the steps S53 to S57 are executed, the operation terminal device 130 may be moved to a different position. Therefore, to obtain the latest position of the operation terminal device 130, steps S58 and S59 which are similar to the steps S51 and S52 are executed here.

The processing apparatus 420 determines whether the point C1 is on the line L41 (step S60). This step is performed to determine if the operation terminal device 130 is positioned between the head of the user and the pointer 130A which is displayed at the offset coordinates.

If it is determined that the point C1 is on the line L41 (S60: YES), the processing apparatus 420 reads the vibration intensity and the vibrating time from the vibration data, generates a driving signal for driving the vibrating elements 133R and 133L of the operation terminal device 130, and transmits the driving signal to the operation terminal device 130 via the communicating section 126 (step S61). As a result, the vibrating elements 133R and 133L of the operation terminal device 130 are driven.

The processing apparatus 420 reads the offset amount from the data storage section 124 (step S62). The data representing the offset amount is stored in the data storage section 124 in advance.

The processing apparatus 420 calculates the coordinates of the point C2 which are further offset, by adding the offset amount to the coordinates of the point C2 (step S63).

The processing apparatus 420 causes the projecting apparatus 110B to display the pointer 130A on the screen 110A, based on the coordinates of the pointer 130A obtained at step S63 (step S64).

After finishing step S64, the process is repeated from the step S51 (repeat).

By repeating the process described above, the operation terminal device 130 will not be positioned between the head of the user and the pointer 130A (point C2) which is displayed at the offset coordinates, that is, it will be determined that the point C1 is not on the line L41 (S60: NO).

When it is determined that the point C1 is not on the line L41 (S60: NO), the processing apparatus 420 repeats the process from the step S51 (repeat) in case the operation terminal device 130 should move.

By performing the process described above, the operation terminal device 130 will not be positioned between the head of the user and the pointer 130A (point C2) which is displayed at the offset coordinates.

As described above, in the simulation system 400 according to the fourth embodiment, if the operation terminal device 130 is positioned between the head of the user and the pointer 130A (point C2) which is displayed at the offset coordinates, the pointer 130A will be moved so that the operation terminal device 130 is not positioned between the head of the user and the pointer 130A (point C2) which is displayed at the offset coordinates.

By moving the pointer 130A, a case where the pointer 130A is hidden behind the operation terminal device 130 is less likely to occur, and the visibility of the pointer 130A will improve.

Accordingly, the simulation system 400 with a good operability can be provided.

The simulation system may also be configured such that an article 111 is displayed in a lighter color when the article 111 is positioned between the head of the user and the pointer 130A (point C2) displayed at the offset coordinates.

Figure 33:
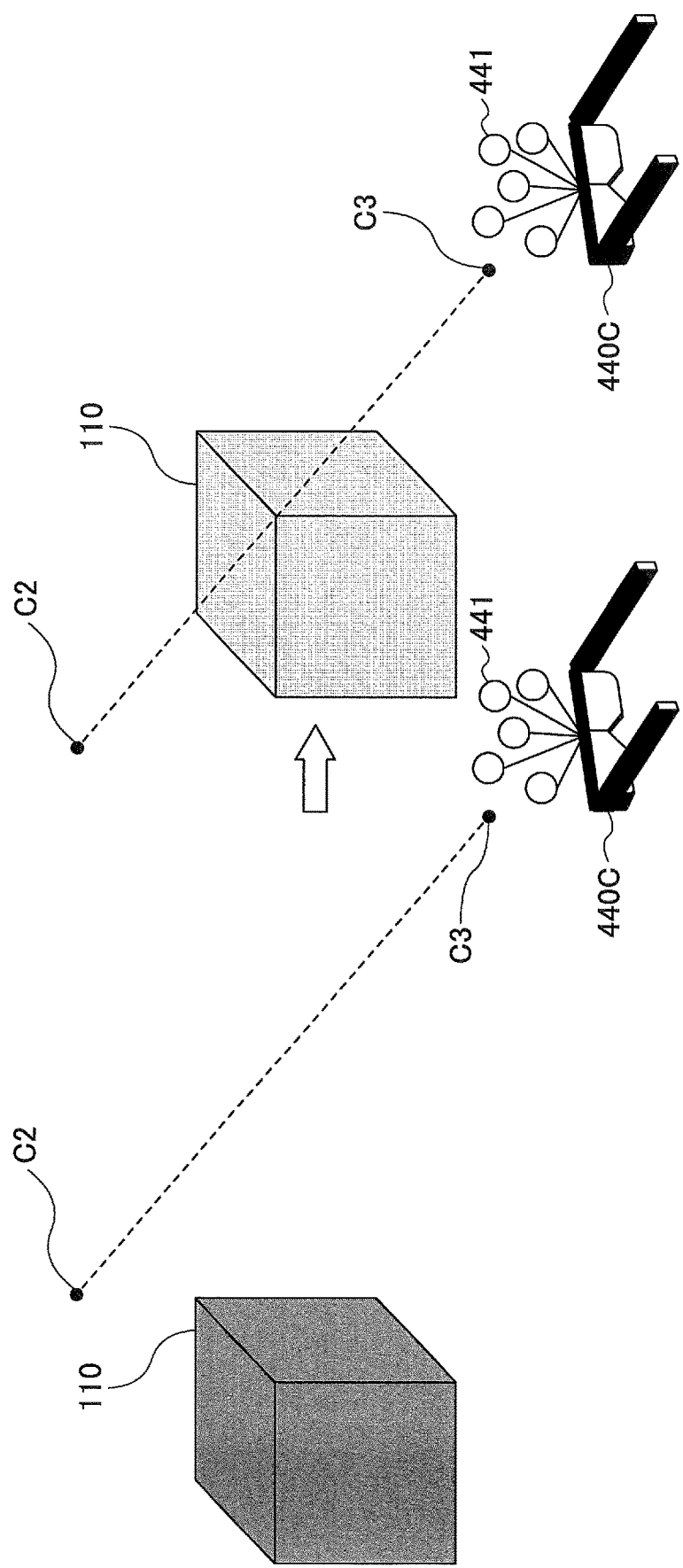
FIG. 33 is a diagram illustrating a modified example of the fourth embodiment.

FIG. 33 is a diagram illustrating a modified example of the fourth embodiment.

For example, as illustrated on the left side of FIG. 33, when the article 111 is not positioned on the line L41 connecting the points C2 and C3, the article 111 may be displayed in a normal color depth so that the article 111 can be seen by the user clearly.

On the other hand, as illustrated on the right side of FIG. 33, when the article 111 is positioned on the line L41 connecting the points C2 and C3, the article 111 may be displayed in a lighter color (translucent color) so that the point C2 and/or the line L41 behind the article 111 can be seen by the user better.

By adopting the displaying method described here, even when at least one of the point C2 and the line L41 are behind the article 111, the user can see the point C2 or the line L41 behind the article 111.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A simulation system comprising:
    a display section configured to display an image of an article based on article data representing a shape and coordinates of the article;
    an operation terminal device comprising an operating section, the operation terminal device being configured to be used by a user holding the operation terminal device with a hand to operate a position of a pointer displayed on the display section by moving the operation terminal device;
    a data storage section configured to store the article data;
    a first detecting section configured to detect a position and an orientation of the operation terminal device;
    a second detecting section configured to calculate first coordinates of the pointer, based on the position and the orientation of the operation terminal device detected by the first detecting section;
    an offset section configured to obtain second coordinates by adding a predetermined offset amount to the first coordinates;
    a locus generating section configured to generate a first line represented by a locus of the second coordinates, each endpoint of the locus respectively being the second coordinates obtained by the offset section when the operating section is first operated, and the second coordinates obtained by the offset section when the operating section is operated for a second time after the operating section is first operated and the operation terminal device is moved; and
    a first determining section configured to make a determination, based on the coordinates included in the article data and line data representing the first line, whether the first line has come in contact with the article displayed on the display section.

2. The simulation system according to claim 1, further comprising a processing apparatus including the second detecting section and a first communicating section,
    wherein the operation terminal device further comprises a time recording unit configured to record time data representing a first time when the operating section is first operated and a second time when the operating section is operated for the second time, and a second communicating section configured to perform wireless communication with the first communicating section,
    the processing apparatus is configured to receive the time data from the operation terminal device via the wireless communication, and
    the locus generating section is configured to generate the locus of the second coordinates whose endpoints are respectively the second coordinates at the first time and the second coordinates at the second time.

3. The simulation system according to claim 1, further comprising a dynamic element, and a drive controlling section configured to drive the dynamic element in response to the determination by the first determining section that the first line has come in contact with the article.

4. A simulation system comprising:
    a display section configured to display an image of an article based on article data representing a shape and coordinates of the article;
    an operation terminal device configured to be used by a user holding the operation terminal device with a hand to operate a position of a pointer displayed on the display section by moving the operation terminal device;
    a data storage section configured to store the article data;
    a first detecting section configured to detect a position and an orientation of the operation terminal device;
    a second detecting section configured to calculate first coordinates of the pointer, based on the position and the orientation of the operation terminal device detected by the first detecting section;
    an offset section configured to obtain second coordinates derived by offsetting the first coordinates; and
    a first determining section configured to make a determination, based on the coordinates included in the article data and line data representing a first line connecting the first coordinates and the second coordinates, whether the first line has come in contact with the article displayed on the display section.

5. The simulation system according to claim 4, further comprising an operating section configured to receive an input instruction to move the first coordinates in a three-dimensional space, wherein the offset section is configured to offset the first coordinates in accordance with the input instruction.

6. The simulation system according to claim 5, further comprising a dynamic element provided to the operating section, and a drive controlling section configured to drive the dynamic element in response to the determination by the first determining section that the first line has come in contact with the article.

7. The simulation system according to claim 6, further comprising a processing apparatus including the second detecting section, the drive controlling section, and a first communicating section,
    wherein the operation terminal device further comprises a second communicating section configured to perform wireless communication with the first communicating section, and
    the dynamic element is driven based on a driving instruction received from the processing apparatus via the wireless communication, the driving instruction being output by the drive controlling section.

8. The simulation system according to claim 4, wherein the offset section is configured to move the second coordinates to an intersection of the first line and the article in response to the intersection being present.

9. The simulation system according to claim 8, wherein, in response to a plurality of the intersections existing, the offset section is configured to move the second coordinates to the intersection closest to the first coordinates among the plurality of the intersections.

10. The simulation system according to claim 4 further comprising:
    a third detecting section configured to detect a position and an orientation of a head of the user;
    a fourth detecting section configured to detect third coordinates representing a position of the head in a coordinate system of an image displayed on the display section, based on the position and the orientation detected by the third detecting section; and
    a second determining section configured to determine whether the first coordinates exist on a second line connecting the second coordinates and the third coordinates,
    wherein the offset section is configured to obtain the second coordinates which are offset to a point in which the first coordinates do not exist on the second line, when it is determined by the second determining section that the first coordinates exist on the second line.

11. The simulation system according to claim 10, wherein the second determining section is configured to determine whether the first coordinates exist in a region including the second line, and the offset section is configured to obtain the second coordinates which are offset to a point in which the first coordinates do not exist in the region, when it is determined by the second determining section that the first coordinates exist in the region.

12. The simulation system according to claim 4, further comprising a display controlling section configured to display the article translucently when the article is on a line connecting the second coordinates and the first coordinates.

* * * * *